US011093971B2

(12) United States Patent
Kurian et al.

(10) Patent No.: US 11,093,971 B2
(45) Date of Patent: Aug. 17, 2021

(54) CONTEXTUAL DISCOVERY

(71) Applicant: KEYPOINT TECHNOLOGIES INDIA PVT. LTD., Hyderabad (IN)

(72) Inventors: Prima Dona Kurian, Hyderabad (IN); Sandeep Yelubolu, Hyderabad (IN); Manish Jha, Hyderabad (IN); Sumit Goswami, Hyderabad (IN); Sunil Motaparti, Hyderabad (IN)

(73) Assignee: KEYPOINT TECHNOLOGIES INDIA PVT LTD., Hyderabad (IN)

( * ) Notice: Subject to any disclaimer, the term of this patent is extended or adjusted under 35 U.S.C. 154(b) by 210 days.

(21) Appl. No.: 15/553,878

(22) PCT Filed: Feb. 25, 2016

(86) PCT No.: PCT/IN2016/000052
§ 371 (c)(1),
(2) Date: Aug. 25, 2017

(87) PCT Pub. No.: WO2016/135746
PCT Pub. Date: Sep. 1, 2016

(65) Prior Publication Data
US 2018/0040020 A1  Feb. 8, 2018

(30) Foreign Application Priority Data
Feb. 27, 2015  (IN) .............................. 947/CHE/2015

(51) Int. Cl.
*G06Q 30/02* (2012.01)
*G06F 16/9535* (2019.01)
(Continued)

(52) U.S. Cl.
CPC ....... *G06Q 30/0256* (2013.01); *G06F 16/951* (2019.01); *G06F 16/9535* (2019.01);
(Continued)

(58) Field of Classification Search
USPC .............................................. 705/319, 14.54
See application file for complete search history.

(56) References Cited

U.S. PATENT DOCUMENTS

2008/0114751 A1* 5/2008 Cramer ............... G06F 16/9535
2008/0189257 A1* 8/2008 Wiseman ............ G06F 16/3337
(Continued)

FOREIGN PATENT DOCUMENTS

WO  2014/141300      9/2014
WO  2014/153086 A2   9/2014
WO  2016/167930 A1  10/2016

OTHER PUBLICATIONS

Context filtering process for mobile web search (Year: 2013).*
(Continued)

*Primary Examiner* — Gautam Ubale
(74) *Attorney, Agent, or Firm* — Benesch, Friedlander, Coplan & Aronoff LLP

(57) ABSTRACT

The present invention provides various systems and methods to intelligently predict the user's intent and persona based on derived hyper-contextual information from user's computing device and device-server ranking system to serve at least one search advertisement or at least one search string relevant to user's intent and persona at the time of user entering input or even before user entering input in the search editor of a computing-device application or webpage in real-time using a recommendation engine. The present invention suggests providing the recommendation engine implemented on the computing device that may enable the user to automatically perform hyper-contextual discovery and intelligently predict user's intent and persona and in response provide at least one search advertisement or at least one search string relevant to user intent.

26 Claims, 23 Drawing Sheets

(51) Int. Cl.
*G06F 16/951* (2019.01)
*G06Q 50/14* (2012.01)
*H04L 29/08* (2006.01)
*H04L 29/06* (2006.01)

(52) U.S. Cl.
CPC ..... *G06Q 30/0251* (2013.01); *G06Q 30/0277* (2013.01); *G06Q 30/0261* (2013.01); *G06Q 30/0269* (2013.01); *G06Q 50/14* (2013.01); *H04L 67/02* (2013.01); *H04L 67/42* (2013.01)

(56) References Cited

U.S. PATENT DOCUMENTS

| | | | |
|---|---|---|---|
| 2008/0281687 A1 | 11/2008 | Hurwitz et al. | |
| 2009/0187463 A1 | 7/2009 | Dacosta | |
| 2011/0166935 A1* | 7/2011 | Armentrout | G06Q 30/0256 705/14.54 |
| 2011/0314084 A1 | 12/2011 | Saretto et al. | |
| 2012/0084248 A1* | 4/2012 | Gavrilescu | G06F 16/9535 706/52 |
| 2012/0158685 A1 | 6/2012 | White et al. | |
| 2012/0239761 A1* | 9/2012 | Linner | G06F 40/279 709/206 |
| 2013/0036117 A1* | 2/2013 | Fisher | G06F 16/487 707/736 |
| 2014/0067535 A1* | 3/2014 | Rezaei | G06Q 50/01 705/14.54 |
| 2017/0124447 A1* | 5/2017 | Chang | G06F 16/3334 |

OTHER PUBLICATIONS

Discovering the Impact of Knowledge in Recommender system (Year: 2011).*
Supporting Ubiquitous Interaction in Dynamic Shared Spaces (Year: 2012).*
Supplementary European Search Report in European Patent Application No. 16754871.8, dated Jun. 7, 2018 (4 pages).

* cited by examiner

| First User Text Input | | | | | |
|---|---|---|---|---|---|
| First User Current Intent | First User Historic Context Across Multiple Applications | First User Profile | First User Device Location | First User Destination Location | Time of Travelling | Current Global Trends |
| Travelling Visiting Eiffel Tower, Watching Movie with Kids | User's Interest in Movies, Type of Conversation with Kids, Frequency of Visiting Eiffel Tower, Types of Stores Visited Near Eiffel Tower | User's Age, User's Preferences, User's Health Condition, User's Personal Luxury or Economical | Location at The Time User Initiated Texting with Second User, Scotland as per the Device's GPS Information | Location Which User is Planning to Visit, Paris as per the Current Context | Thanksgiving, Which would be in the Month of November | Current Available Tourism Packages, Places Visiting at the Time of Thanksgiving |

CONTEXTUAL DISCOVERY

I. FIELD OF THE INVENTION

The present invention generally relates to advertisements and in particular to systems and methods for serving search advertisements and search strings in real-time.

II. BACKGROUND TO THE INVENTION

Over the past decade, the growth of Internet technology has provided an important source of communication and information exchange to individuals and businesses. Various web based services have evolved over time, through which vendors can advertise and sell products directly to potential clients. To attract potential consumers, however, the businesses require advertising. One of the most common and conventional advertising techniques applied on the Internet is to provide advertising promotions on the web pages of another websites which directs the end user to the advertiser's site when the advertising promotion is selected by the end user. The conventional on-line marketing and advertising techniques are often limited in their ability to provide contextually relevant information to the end-users.

Alternatively, users may search relevant content from the vast resources of information available on the internet. For example, when a user wishes to buy a product or avail of any services, then the user may search for said products or services using the internet resources. However, accessing the web content for searching and shortlisting a relevant service or product is time consuming for the end-user. In addition, searching for a requisite product or service on the internet exposes the user to security and privacy related issues, and should be avoided.

The patent application, U.S. Pat. No. 8,510,238, discloses a machine learning service executing on a mobile platform that identifies context related data associated with the mobile platform and application related data received from mobile platform and notifies user an event or a feature related to upcoming user actions and like. The context related data as per this invention can be phone number data, contact data, current date, time, duration of application usage, information on user's calendar, current location of user, user preference information, user' health statistics, user's behaviour with the applications and other device information. And upon identification of context related data, the system of this particular invention predicts an action and notifies user an action related to the context data or automatically implements the action on the user's device. These actions can be volume turn up/down action, notifying user to drive home and like.

The object of the invention is to discover intents of the users through usage of a computing device by the user and based on that to provide intent related information onto the computing device.

III. SUMMARY OF THE INVENTION

The object of the invention is achieved by intent discovery applications of claims 1 and 32, a client device of claim 23, and a system of claim 29.

According to one embodiment of the intent discovery application which on execution enables a processing unit of a client device to receive a set of information from a data acquisition unit on the computing device, to process the set of information to establish a relation or a map between contents of the set of information and to determine at least one intent of the user of the computing device based on the established relation and to prioritize the intents, if more than one intents are determined, to process the set of information to determine occurrence of an event, to render the intent related information in real-time onto the user device based on the time of occurrence of the event and on at least one intent of the user of the device. The set of information comprises a plurality of contents, such that the content may refer to at least one intent of an user of the computing device. The data acquisition unit is adapted to acquire the set of information in real time from at least one application currently running or previously running on the computing device.

According to another embodiment of the intent discovery application, wherein the intents are changed dynamically based on set of information and the intent related information is changed dynamically based on change of intents.

According to yet another embodiment of the intent discovery application, wherein the event is related to at least a temporal aspect, interactions with an application running on the computing device, a text input or location.

According to one embodiment of the intent discovery application, wherein the set of information is processed using semantic analysis to identify words and phrases, and further the words and phrases are processed to identify contextual relations between them to determine the likeliness of a word being grouped with other words of the phrase so that the context of entire phrase can be determined.

According to another embodiment of the intent discovery application, wherein intent of the user determined using the set of information being typed/entered/derived or typed/entered/derived in past across one or more computing device applications.

According to yet another embodiment of the intent discovery application, wherein the intent related information comprises at least one of an advertisement, a search strings, a text, a video, an audio, a service, a Uniform Resource Locator (URL), or a computing device application.

According to one embodiment of the intent discovery application, wherein intents and the intent related information has at least one of the one to one, one to many and many to one relation between them.

According to another embodiment of the intent discovery application, wherein the processing unit is enabled to at least map the set of information to a dictionary or map a word/phrase of one dictionary onto word/phrase of another dictionary, and the dictionary is at least a language dictionary, a dictionary of search keywords, a dictionary of advertisements related words, a user-defined dictionary, or a intent mapping dictionary.

According to yet another embodiment of the intent discovery application, the intent predicted at one instance is mapped with another intent fed at another instance in intent mapping dictionary.

According to one embodiment of the intent discovery application, wherein the set of information captured is in one language and the intent related information rendered is in same or another language.

According to another embodiment of the intent discovery application, wherein the processor is adapted to generate a look-up chain of intent related information, to process the look-up chain by hoping the look-up chain to determine proximity of one intent to another intent, and to render an intent related information onto the computing device based on proximity of the intents.

According to yet another embodiment of the intent discovery application, wherein the processor is enabled to divide the set of information in different priority levels, and the intent related information generated based on the each priority level of set of information corresponds to similar priority in the look-up chain.

According to one intent of the intent discovery application, wherein the determined intents are stored within a multi-dimensional vector, each dimension of the vector is created with a map between the intents and the map is associated with at least one attribute, wherein the attributes are related to at least time, a set of related intents, a location, a date, text entered at that instance, language of the text entered at that instance, user's preferences.

According to another embodiment of the intent discovery application, wherein the intent related information is determined by comparing multi-dimensional vector of the user of the computing device with multi-dimensional vectors stored at a server.

According to yet another the intent discovery application, wherein the processing unit is adapted to generate a client device ranking of the intent related information based on the set of information typed/entered/derived in past across one or more computing device applications, and the processor is adapted to render the intent related information by processing the set of information and the device ranking.

According to one embodiment of the intent discovery application, wherein the processor is adapted to generate a server device ranking of the intent related information is based on at least one of a form data filled out by a category or user in relation to a particular intent, and an analytic information adapted to be collected by the processing unit, and the processor is adapted to render the intent related information by processing the set of information and the device ranking.

According to another embodiment of the intent discovery application, wherein the set of information is acquired by the data acquisition unit from at least one of a web application, a mobile application, and a desktop application. The web application is any of an email client, a chat client, a web page, a widget, a search engine or an applet. The mobile application is any of a home-screen, a web browser, an email client, a chat client, a web page, or an applet.

According to yet another embodiment of the intent discovery application, wherein the intent discovery application is adapted to be integrated as a plug-in into any of the web application, the mobile application, the desktop application, a home-screen application, and a widget application.

According to one embodiment of the intent discovery application, wherein the set of information comprises at least one of the Contextual Search information, Contextual Discovery, Contextual Social information, User preference context, user application interaction context.

According to another embodiment of the intent discovery application, the intent discovery application is adapted to be integrated to a keyboard for enabling typing of the set of information, wherein the keyboard comprises a suggestion bar for displaying the intent related information.

According to yet another embodiment of the intent discovery application, on integrating the keyboard, the keyboard is adapted to display a contextual discovery key, the contextual discovery key is adapted to indicate for presence of any intent related information while a text is being typed or recently typed using the keyboard.

According to one embodiment of the intent discovery application, the processing unit is adapted to process the set of information based on at least semantic analysis and sentiment analysis.

IV. BRIEF DESCRIPTION OF THE DRAWINGS

The advantages and features of the present invention will become better understood with reference to the detailed description taken in conjunction with the accompanying drawings, wherein like elements are identified with like symbols, and in which:

FIG. 05 illustrates a block diagram on predicting intents based on type of data derived from the computing device.

The drawings referred to in this description are not to be understood as being drawn to scale except if specifically noted, and such drawings are only exemplary in nature.

V. DETAILED DESCRIPTION OF THE INVENTION

Incorporating the Application number PCT/IN2014/000113 by reference.

The best and other modes for carrying out the present invention are presented in terms of the embodiments, herein depicted in FIGS. 2 to 17. The embodiments are described herein for illustrative purposes and are subject to many variations. It is understood that various omissions and substitutions of equivalents are contemplated as circumstances may suggest or render expedient, but are intended to cover the application or implementation without departing from the spirit or scope of the present invention. Further, it is to be understood that the phraseology and terminology employed herein are for the purpose of the description and should not be regarded as limiting. Any heading utilized within this description is for convenience only and has no legal or limiting effect.

The terms "a" and "an" herein do not denote a limitation of quantity, but rather denote the presence of at least one of the referenced item.

Figure 1:
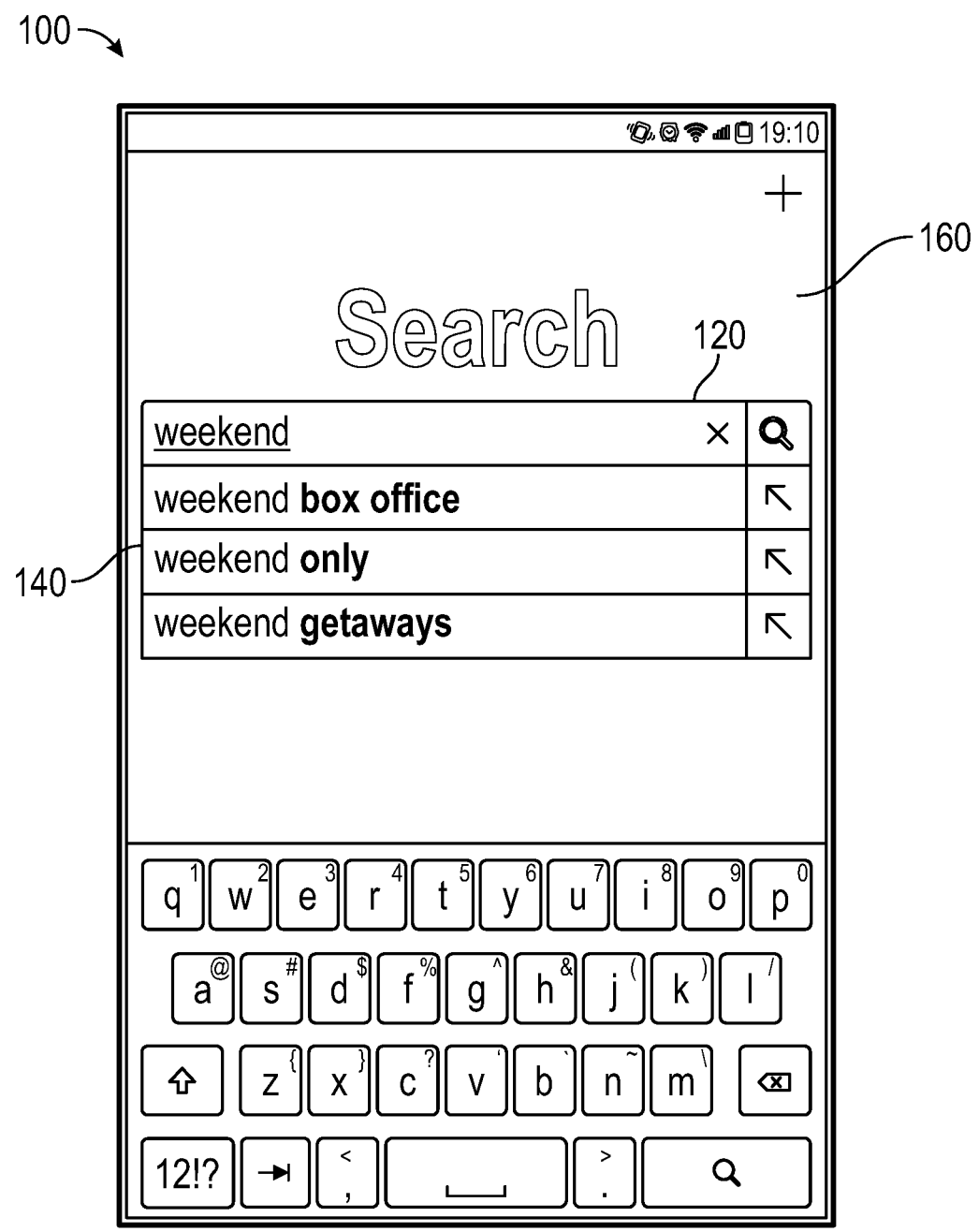
FIG. 01 illustrates a screen shot of a conventional browser application displaying search strings when user enters text in search editor.

Typically users of internet perform search using various internet resources for accessing content such as information associated with various products and, services. Referring now to FIG. 1, an example process is illustrated where user enters text in search editor 120 of a web search engine in a computing device 160 to find out products related to the word 'weekend'. When the user is entering the text, the web search engine suggests search strings 140 just below the search editor 120 to guide user what he is trying to type.

Upon tapping/selecting any one of the complete suggested search string 140 which is provided in drop down window or upon pressing the enter key on the keyboard after typing the entire text, the entire search string gets captured by the application/webpage where the search editor is integrated and certain results along with the advertisements, offers, promotions that are associated with the search strings are displayed on a new webpage or a different webpage and provided to the user. Typically such search advertisements are provided to user on new or different webpage but not at the time of entering text in the search editor.

The present invention provides various systems and methods to intelligently predict the user's intent and persona based on derived contextual information from user's computing device and device-server ranking system to serve at least one search advertisement or at least one search string relevant to user's intent and persona at the time of user entering input or even before user entering input in the search editor of a computing-device application or webpage in real-time using a recommendation engine. The present invention suggests providing the recommendation engine implemented on the computing device that may enable the user to automatically perform contextual discovery and intelligently predict user's intent and persona and in response provide at least one search advertisement or at least one search string relevant to context of user intent.

The recommendation engine of the present invention acts as a intent discovery engine and an advertisement or a string serving engine to intelligently predict user's intent and persona and serves at a notification region the search advertisements or search strings when user is using a search editor of an application implemented in a computing device. The search advertisements or search strings served are relevant to user's intent and persona, which is identified based on contextual information and device-server ranking system.

The editor is need not be a search editor, the recommendation engine of the present invention can serve such search advertisements or search strings even the user is entering text in any editor of any computing device application.

The contextual information of the present invention is the information or the contextual information or the content derived from the computing device. It primarily comprises of content of historic and current context of computing device applications which are already configured on the computed device. The content identified across all the computing device applications can be user's input in an application, user's input across one or more applications, computing device information, text shared between user and a second user using a messaging application, text entered in an editor, text entered in one or more languages, user's historic or current interaction with all the applications, information related to sequence of using or opening the applications, information related to historic or current tap events implemented on at least one application of the computing device, user's preferences aggregated among all the computing device applications and the like. Once the content is identified across all the computing device applications, the content is analyzed in a way to establish a sense and extract an intent, which may be the current or future, and serve search advertisements or search strings associated to the extracted intent at the right time or on a timely basis. The search advertisements or search strings can be served at that instant for the extracted intent or served for a time period till the user reaches the destiny or location or till the time arrives or till the time user's intent is active.

In addition, the contextual information of the present invention also comprises of factors like historic information of search results, historic information of selection of search results, search results obtained among multiple search editors, recent trending search results, dynamic learning of context relation between word and phrase, dynamic learning of interaction between word frequency/phrase context, user's intent, search context dictionaries, language dictionary, adwords dictionary, user-defined dictionary, content of received message, previous text entered in an editor, phonetic input, language of input, voice input, emoticons input, relative keywords used, recent tap events on the computing device, recent tap events on the applications implemented on the computing device, recent gesture events on the applications implemented on the computing device, user's computing device information context, location context, search context, application context, time period of using a computing device application or software, time period of viewing a page or the screen displayed upon interacting with a device application or software, editor context, time context, device type, browser context, network type, operating system type, operator type. previous selection of search advertisements or search strings, recent use of computing device applications and its sequence of usage, user's profile, mood and sentiment based information, and the like.

In particular embodiments, the contextual information is derived from the computing device and is, can be at least one of the following, but not limited to, Contextual Search information, Contextual Discovery information, Contextual Social information, Contextual User preference information, Contextual user application interaction information. Contextual information is stored and processed on computing device or on server or both to predict intent accurately and deliver content, services, information and the like in real-time.

Contextual Search information across one or more applications configured on computing device can be extracted from the system of the present invention in a search editor of one or more applications. It comprises of contextual information derived from current and historic information of search results across applications derived on the computing device and/or server, historic information of selection of search results, search results obtained among multiple search editors, recent trending search strings provided by the present invention, dynamic learning of context relation between word and phrase, dynamic learning of interaction between word frequency/phrase context, erroneous input, search context database on computing device and/or server, search context associations, ontological classification of search queries, language dictionary, adwords dictionary, user-defined dictionary, content of received message, previous text entered in any editor, phonetic input, language of input as dynamically deciphered or specified by user, voice input, emoticons input, relative keywords used in the search editor. The database can be any dynamic learning structure to hold information about search query associations, affinities, ontological classification, temporal and spatial insights, user profiling and search behaviour identified based on search input across one or more search applications or the applications having search field.

Contextual Discovery information across one or more applications configured on the computing device comprises of the information derived from current and historic text shared between user and a recipient using a messaging application, current and historic input in any editor other than search editor, one or more received messages information, text entered in one or more languages, phonetic input, language of input as dynamically deciphered or specified by user, voice input, emoticons input, relative keywords used in the editor, dynamic learning of context relation between word and phrase, dynamic learning of interaction between word-frequency/phrase context, erroneous input contextual database on computing device and/or server, context associations, ontological classification of words. Discovery contextual information can be inter-related with social contextual information and user preference context.

Contextual Social information can be the information across one or more social applications configured on user's computing device. Such information can be current and historic information derived from at least one of the following applications, but not limited to, a social networking application, a messenger application, a contact storage application and the like, configured on one or more computing devices. The derived information can be stored on a storage unit (like server) and also locally on the computing device. In particular embodiments, derived social contextual information comprises of a network which is created based on contacts of user, friends of user, favorite people of user, followers of user and the like present on one or more computing devices and the network of information is stored on the storage unit. The information is processed by a processing unit on the storage unit or on computing device so that a relation can be established by interlinking profiles of one user to other user or by interlinking a first user to a second user based on the derived information. The processed information can be used for suggesting a user regarding the number of people in user's network interacted or utilized or showed interest to a contextual content. The suggested information can be displayed on notification area to the user.

Contextual User preference information can be the current and historic preferences provided by user in one or more applications, which can be email application, social networking application, gaming application, fitness application, e-commerce application, browsing application, and the like. Apart from deriving such preferences information, the systems and the methods of the present invention can also predict user preference based on the input given in editor of one or more applications.

Contextual User application interaction information can be user's historic or current interaction with one or more computing device applications, information related to sequence of using or opening one or more applications, information related to historic or current tap events implemented on at least one application of the computing device and the like.

The derived contextual information consists of plurality of contents which may or may not relate to each other and the content may have at least one type of intent. This information is analyzed and processed by the application of semantic and sentiment methods in order to establish a relation between the derived/extracted contents and based on the established relation, the intents can be predicted. The search advertisements or search strings can be served at that instant for the predicted intent or served for a time period till the user reaches the destiny or location Or till the time arrives or till the time predicted intent is active.

In addition to the above said factors, the contextual information can be obtained from contextual relation between word and phrase to determine the likeliness of word being grouped other words of the phrase so that the context of entire phrase can be determined.

Further, the recommendation engine of the present invention has the ability to serve right advertisements/search strings even user enters a word that is not in standard dictionary or user enters a erroneous word, an incorrect word, for example, "caxi" instead of "taxi", "koffi" instead of "coffee", "movei" instead of "movie". The ability to serve right advertisements/search strings is not based on language prediction system but based on the user's contextual information and recent information typed/entered/derived across one or more computing device applications. Also, the advertisements/search strings are served not only to the exact keywords but also to the related keywords. For example, for a phrase "I wanted to have a cup of coffee", advertisements/search strings related to coffee shops are displayed to user when user entering the word "cup", "of" and "coffee". The ability to serve advertisements/search strings is not based on phrase/sentence prediction system or a language model, it is based on user's contextual information and recent information typed/entered/derived across one or more computing device applications. It is not limited to serve advertisements/search strings but it can also be a content, a service, a Uniform Resource Locator (URL), a computing device application or, software. The content can be a text content, audio content, video content, etc. The service can be calendar event, conference event, etc.

In another embodiment, the contextual information can be obtained by maintaining maps between two or more dictionaries so that a word/phrase of one dictionary can be mapped with another word/phrase of another dictionary. Similarly, the intent predicted at one instance can be mapped with another intent fed at another instance. In this embodiment, the word "intent" and "dictionary" are interchangeable unless the context requires otherwise. The dictionaries can be a language dictionary, search context dictionary, adword dictionary, user intent map, and user-defined dictionary. It is not restricted to maintain map between two or more dictionaries, it can also be a map between two or more user intents, which is obtained from historic context across device applications/softwares and user preferences. The maps are used to serve search advertisements of one language or search strings of one language when user has entered text in a second language. For instance, if user has entered text "alimentos" (means Food) in Spanish language, the recommendation engine of the present invention can intelligently predict user's intent and serve search advertisements of English language, in this case search advertisements related to "Food" and "Restaurants" can be served. In another instance, if user has entered text "फ़ूड" (transliterated text of the word "Food") in Hindi language, the recommendation engine of the present invention can intelligently predict the intent and serve search advertisements of transliterated version of English language, search advertisements of user's current input language based on user's derived intent, sentiment, mood and preferences. These search advertisements can be changed dynamically in real time. Also, the system can learn any regional language input and translates and then serves a search advertisement or search string in English language. In another instance, mapping between two or more intents can take place as described in the following scenario. A user wanted to attend a conference which is scheduled in the coming weekend in a neighbouring state. The most proximal intent to user is the first intent to attend the conference in the neighbouring state. The second intent is one hop away in terms of intent proximity, which is to travel to the neighbouring state or the stay in the neighbouring state, the third intent can be the travel from the user's stay (for example a hotel) to the conference place and the fourth intent can be the places nearby for the user to visit after the conference.

The intent attributes can be mapped in a look up chain in the computing device, where the proximity of one intent to another intent in terms of the hops alongside other qualified contextual information related to the user intent, advertisement type related to the user intent, language insights, regions of relevance for that user intent, demographics of users for that user intent, etc can be mapped. Demographics may include information on age, sex, interests, region, religion amongst other attributes etc.

Figure 2:
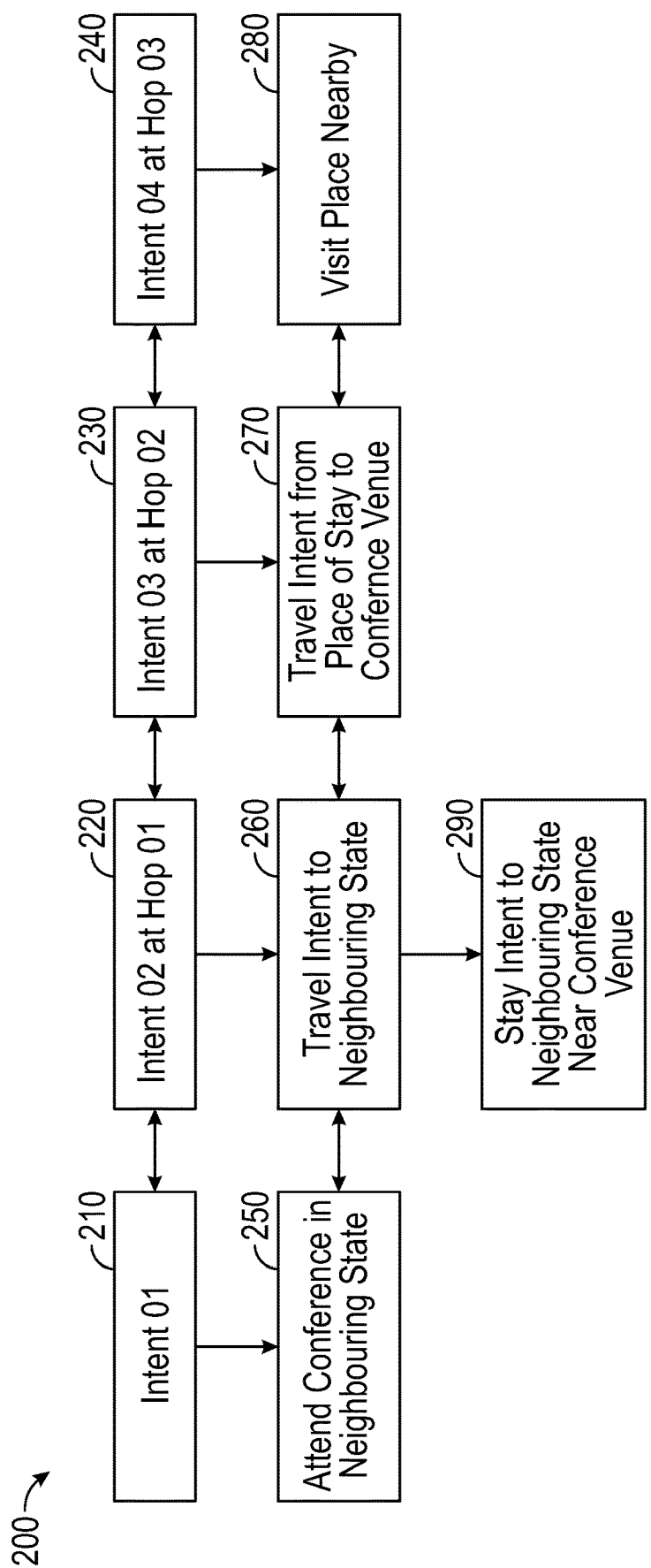
FIG. 02 illustrates a block diagram on maintaining a map between the intents.

Historic insights and analysis can be used to identify the right user intent. Once the intents are identified, the recommendation engine maps the intents dynamically and predicts intelligently the type of search advertisements by considering the location of the user and timeline of the user intent lifecycle. For example, if a user wants to attend a conference in the neighbouring state, it can be considered as intent 1 as shown as 210 in the FIG. 02. The intent is described as 250 in FIG. 02. The second intent possibly can be travelling to neighbouring state. The advertisements initially may be offered around intent1 and intent2. And as the conference date draws closer, advertisements related to travel intent from place to stay near to conference venue, intent3 and visit places nearby, intent4 can be offered. i.e., Initially the search advertisements/search strings on travelling can be served, for example, flight fares, and then later on for the next intent, the search advertisements/search strings on hotel for the stay at the neighbouring state can be served, based on the location, the search advertisements related to local taxi services to move from hotel to the conference can be served and then very proximal to the conference dates, search advertisements/search strings related to local pubs, restaurants or movie theatres can be served. However, this embodiment is not limited to serve search advertisements but can also serve search strings. The advertisements based on user intent may be predicted even before a search is initiated or discovered by user in other computer/software applications. FIG. 2 illustrates a flow on how the intents are mapped dynamically.

In the system of the present invention, the predicted intents from the contextual information are stored within a multi-dimensional vector, where the each dimension of the vector is created with a map between the intents and the map is associated with at least one attribute. The attributes can include but not limited to time, set of related intents, location, date, text entered at that instance, language of the text entered at that instance, user's preferences and the like. The multi-dimensional vector can be stored on the computing device or on the server. The multi-dimensional vector created for a single user can be compared with a set of multi-dimensional vectors stored on the server to analyze and provide the relevant search advertisement/search string to the user at the right time. The user intent map may be searched in real time as user inputs current text to identify historic intent matches, current intent matches etc. The search may be done with intent results served from a server component. The combined client server ranking of matching user intent then will be used to identify the right content, service to serve to the user. The content or service can be looked up in a related map or derived from the server component. Once the user selects or initiates a call to action on any of the displayed results or interacted with the displayed results, the underlying intent map and related dictionaries, data structures are updated. The intent map may track and store information from multiple sources like historic, current and actual interaction patterns of the user.

The language dictionary, as mentioned above, is a dictionary comprising of a list of words of a language with information given for each word. The language can be a standard language, a language that is used while inputting text in the editor, a language which is created by combing two or more languages and the like.

The search context dictionary, as mentioned above, is a dictionary comprising of words related to products, features, places, movies, names and the like. This dictionary is specific to each language. The search context dictionary is integrated with the recommendation engine of the present invention to provide keywords based on user's input in an editor. This dictionary is prioritized by correlating with the search context of the social graph where context related to one or more users can be obtained from one or more users of the recommendation engine, from the publicly available information, from the data received from other third party services which are into data processing domain. The search dictionaries can be maintained at the device end and as database at the server end.

The adword dictionary, as mentioned above, is a dictionary comprising of words used for advertising purpose, sponsoring purpose, etc.

The user-defined, dictionary, as mentioned above, is a dictionary comprising of words which are typed by the user but are not present in the standard dictionary. These words are typed using the keyboard which is integrated with recommendation engine of the present invention and said typed words are stored locally on the computing device.

The contextual information obtained from user's computing device can also be combined or compared with contextual information stored at a server. The contextual information that is stored at a server is obtained globally from one or more users of the recommendation engine of the present invention.

If more than one advertiser is associated with one set of contextual information, the recommendation engine of the present invention implements computing device-server ranking system to identify the relevant search advertisement type. The search advertisements are ranked at server end by considering factors like keyword/phrase/hyper-context price, price for the display area, cost per click, cost per impression, number of advertisers, impressions of search advertisements captured at a specific area, clicks of search advertisements captured at a specific area and the like. Once the search advertisements are prioritized at server end, they are ranked and displayed at notification region to user by considering several factors at user's computing device end like user preference, time, location, recent input contextual information, recent search advertisements viewed, recent language of conversion, recent conversation type, recent language type used for conversation, mood type, sentiment etc. The search advertisements are displayed to user based on global ranking or local region ranking. In addition, the recommendation engine may consider user's long term interest or short term interest based on user's historic contextual information and preferences.

Also the process of predicting the user's intent or persona can be performed on the user's computing device or at the server or cloud computing in real time or periodically.

However it is not limited to serve type of search advertisements and type of search strings using recommendation engine of the present invention, the recommendation engine can also serve content, services, a Uniform Resource Locator (URL), a computing device application or software. The content can be a text content, audio content, video content, etc. The service can be calendar event, conference event, etc. The contextual services can be notifying user about upcoming user's events, climatic condition of user's location which is identified by location of user's computing device, calendar events, conference, etc. Further the recommendation engine of the present invention can serve services, content based on topic, sentence, mood, intended phrase, etc.

According to another embodiment of the recommendation engine, the recommendation engine be implemented on the computing device as a computing device application or software, a plug-in, script, source code, applet integrated with any of the web application, the mobile application, the desktop application, a home screen application, a widget application, plug-in integrated with an operating system.

Also, it is not limited to serve one search advertisement, the recommendation engine of the present invention can also serve more than one search advertisement based on the contextual information input and/or shared between multiple computing device applications or softwares.

In accordance with another embodiment, when the recommendation engine of the present invention is integrated with a keyboard application of the computing device or when the recommendation engine is directly provided as a keyboard application to the computing device, a contextual discovery key is provided on the keyboard application. Once the user's intent and persona is identified, certain types of search advertisements and contents are identified from server and are notified to user by displaying the search advertisements on suggestion bar. Also, the search advertisements are notified to user using the said contextual discovery key. The notification from the contextual discovery key can be a colour change, a vibration, a tone, an animation and the like. Upon accessing the contextual discovery key, certain types of search advertisements and contents are displayed to user. However, it is not limited to integrate the contextual discovery key in the keyboard; it can also be provided as a blob or icon as an underlying system on the computing device which is explained in the description of FIGS. 19, 20 and 21. The contextual discovery key has an ability to indicate user at the time of entering text in the editor though user is not entering the complete word/phrase, which means the key acts as a predictive key such that it has an ability to serve search advertisement when user has entered the partial text or incomplete word/phrase or incorrect word/phrase. Also these search advertisements or search strings can be displayed to user on the home screen of the computing device when the user minimized or closed the application or the software that is used recently.

In a different embodiment, the user has entered no text in any editor or the editor is remained blank or the keyboard platform is minimized, the recommendation engine of the present invention serves at least one search advertisement or sponsored search string at the notification region based on application or software type, historic contextual information captured across other computing device applications or softwares, user's intent like offers, deals, discounts, etc and user's preferences like movies over shopping at weekends and the like.

The user's computing device of the present invention can be a mobile phone, a PDA (Personal Digital Assistant), a laptop, a smart watch, a tablet or any computing device. The search advertisements, search strings, content, a Uniform Resource Locator (URL), a computing device application or software are notified to user in the notification region as a blob, an indicator, a flash message, a pop-up notification, an audio output, a video output. The notification region can be a region at any position on the screen of the computing device. The user input can be a text input, voice input, emoticon input, etc.

In an typical embodiment, if a first user is staying at home which is located in Scotland and texting with a second user about his plan in the current weekend, for example, "Hi buddy, would you like to go trekking this weekend? The country side has some good options and few trekking gear shops." and later when the first user is entering text related to travel, shop, weekend or plan in search editor or any other editor of a browser, a messenger application, a device application, etc; the recommendation engine of the present invention intelligently predicts user's intent and persona based on the contextual information identified across multiple computing device applications. Based on the contextual information, the type of content and type of search advertisement can be identified and respective search advertisement or search strings can be served to user when user is using a search editor of any computing device application. However it is not limited to the search editor, the recommendation engine can serve relevant search advertisements or search strings to user even when user is entering text in any editor of any computing device application. The contextual information can be identified based on historic contextual data, current location of device, destination location, time of travelling, derived future intents. In the current scenario, the current location of computing device is "Scotland" from where user is initiated texting process, factors like distance between current location and destination location, way to reach destination location, time to reach destination location can be considered in this case. The destination location is "country side", the recommendation engine may consider the destination location as "Arrochar Alps", but it is not restricted to consider the place "Arrochar Alps" alone it can be other locations which are close to Scotland. Derived future intents are trekking, intent to visit a place, purchase intent, shopping trekking gear intent, carrying food, after finishing the trek, user may wanted to visit a spa, etc. The historic contextual data across one or more computing device applications/softwares is also obtained and this data can be user's past travelling places, user's past trekking interest, user's past trekking frequency, user's behaviour, mood, sentiment, user's past discussion on cost or budgeting amount for any weekend plan, user's health condition, user's interest in activities during weekend, trek, etc. The time is current weekend as per the current scenario and it could be a one day trip or two days trip.

Figure 3:
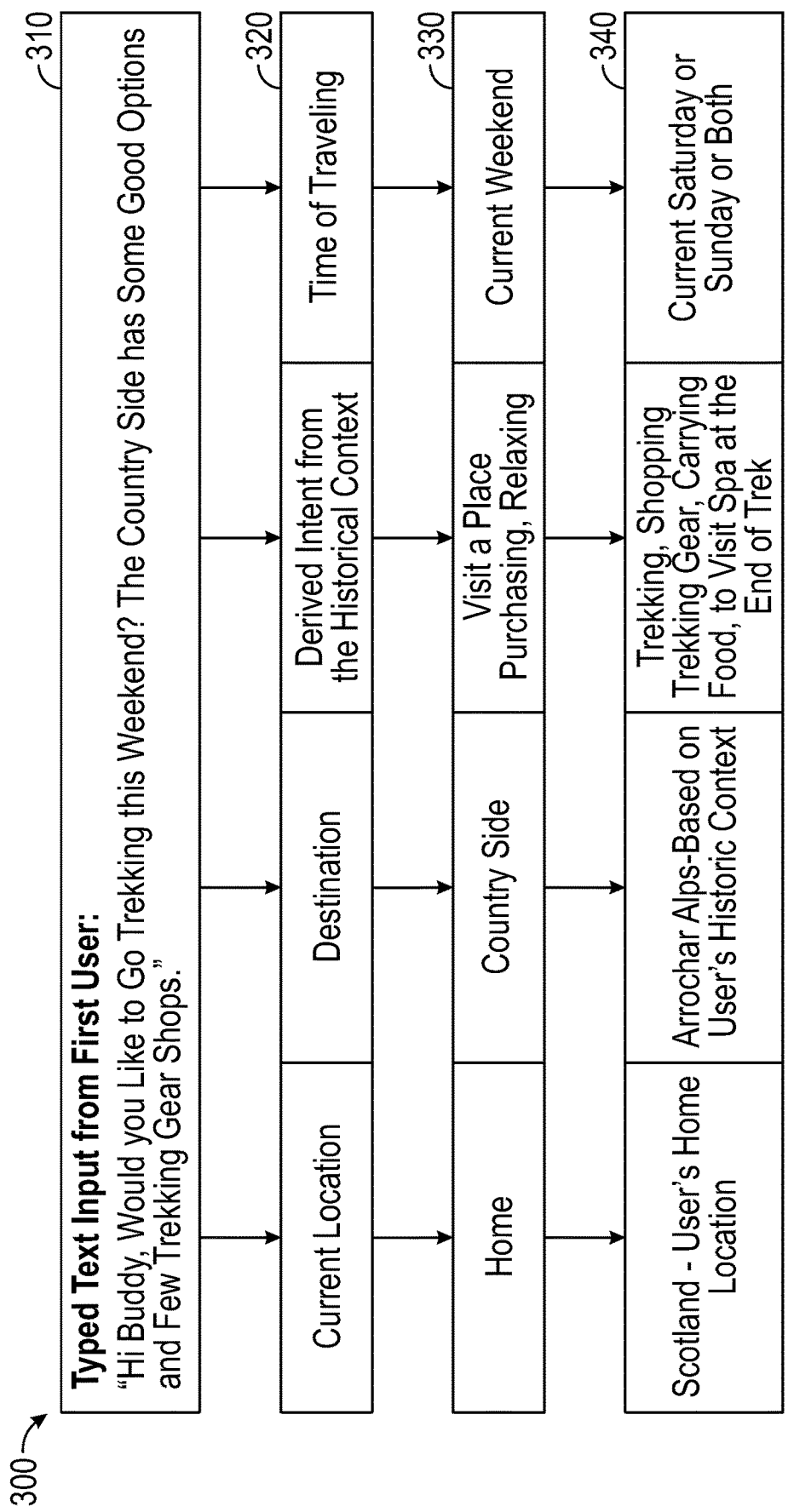
FIG. 03 illustrates a block diagram on flow of deriving intents.

The flow of deriving intents from the above said example is well illustrated in the FIG. 03. 310 represents the text typed by the first user. The first level of factors derived from the text is shown as 320. The current location of the first user is identified by the first user's computing device GPS data and other factors include but not limited to destination, intent, travelling time are derived from the text typed by the first user. The obtained factors are further correlated with the historic context of the first user across one or more applications to derive the actual intent of the user. The second level of factors, shown as 330, include but not limited to, home, country side, visiting a place, purchasing intent, relaxing intent, current weekend. The second level of factors is derived by considering the text typed by the first user and the historic context across one or more applications on the computing device. Based on these factors, the appropriate location of the first user and the future intents are derived, and are shown as 340. First user's location is identified as home and the location of home is identified as Scotland, his interest towards country side trekking is considered as destination point and identified as Arrochar Alps and the derived intents are predicted as trekking, shopping trekking gear, carrying food, visiting spa and the like. The time to travel is identified as current weekend, which can be Saturday or Sunday or both. The identified contextual information is used to serve the type of content or the type of search advertisement or type of sponsored search string to user till user reaches the destination location or till the planned date approaches. Once the type of content of the type of search advertisement or type of sponsored search string is served, the respective search advertisements/content/search string is served to user and these can be changed dynamically on timely basis and user's preferences. For example, user may receive initially search advertisements related to travelling to reach destination location and may receive search advertisements related to bus travels or cab travels but later on as the weekend approaches, if there is any offer is available with respect to bus travels or cab travels, the search advertisements are changed dynamically or periodically.

Also, the search advertisements are changed dynamically if there is any offer related to flight fare is available at that moment, based on the current trends followed to visit a place, based on climatic condition to visit a place. Such search advertisements on flight fares are served to user dynamically based on user's budgeted amount information for the weekend trips, user's intent, which is obtained from user's recent and past activities and interactions across multiple device applications/softwares. One such activity can be user's input across multiple device applications/softwares. Further, same search advertisements or search strings can be served to user for a time frame which could be a day, a week, a month, a quarter of a year till the user approaches the travelling plan or till user reaches the destination location. Once the time frame is expired another search advertisement/search string can be served to user for the time frame as discussed.

Figure 4:
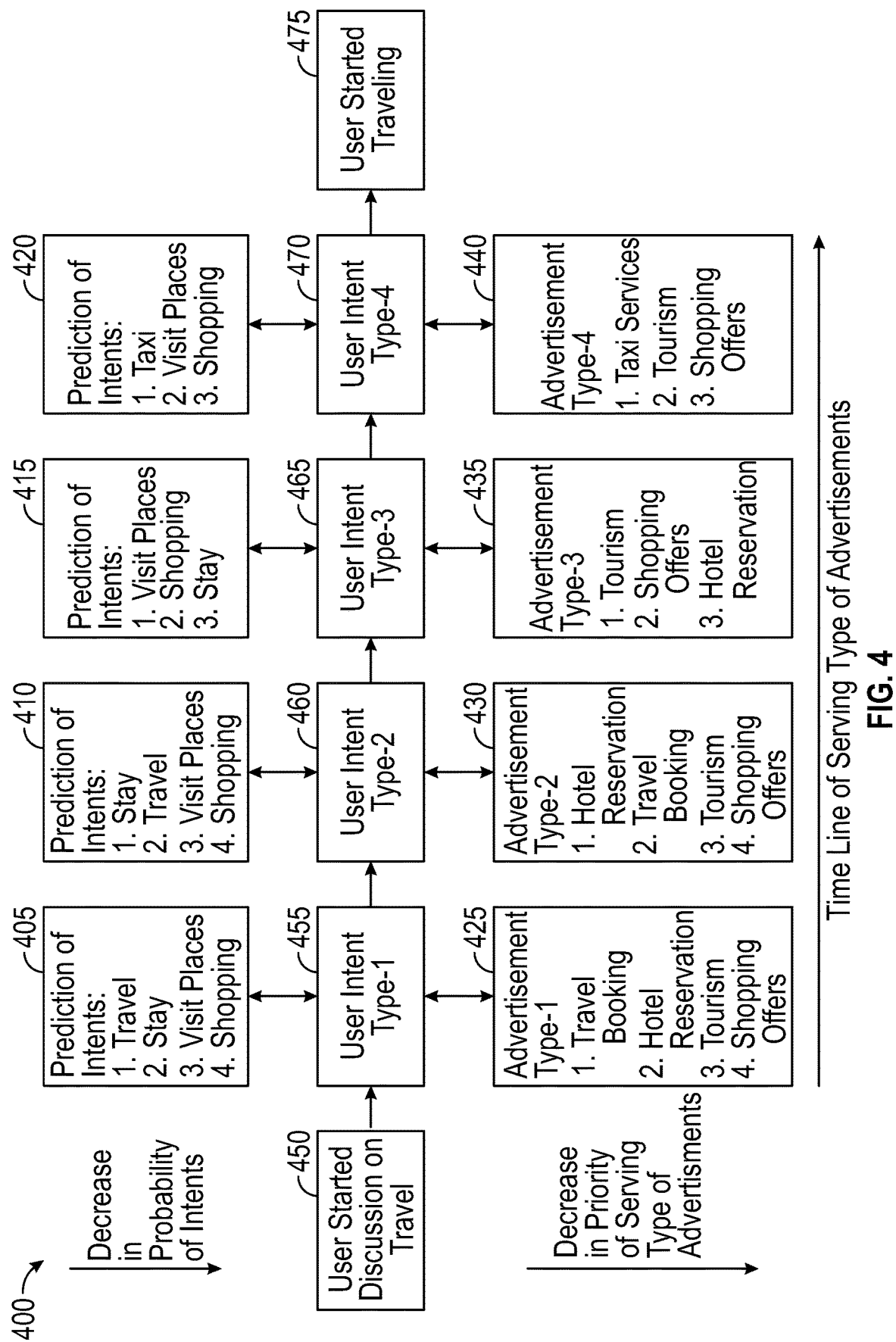
FIG. 04 illustrates a block diagram on flow of deriving intents and prioritizing the intents based on time factor and user's interest at the moment.

FIG. 04 illustrates a flow of intents, 400, predicted based on the historic contextual information identified across one or more computing device applications and computing device hardware information. The intents are predicted from the time the discussion is initiated. In the current illustration, at the beginning, the user has started discussing with friends on travel, 450. The recommendation engine of the present invention predicts the type of search advertisements or search strings based on the user's intent and user's profile. The predicted intents are shown as 405, which can be Travel, Stay, Visit places and Shopping. These intents are predicted in an order based on the user's previous text input, user's previous conversation, user's profile and other contextual information identified across one or more computing device applications. The type of search advertisements or search strings, as shown in 425 for Intent type-1, are predicted again based on the intents. The intents and the priority of the intents depend on time, so when user approaches the destiny or approaches the time line he/she prefers to travel, the intents and their priority gets changed and hence the type of search advertisements or search strings gets changed and served accordingly to the user at the right time. As the time moves on, the user Intent type-2 comprises of a set of intents as shown in 410 and the priority of these intents are changed. Now the first user intent is Stay followed by Travel, Visit Places and Shopping. The change in the priority also depends on the user's interest. For example, if user has already booked the tickets for Travelling or user has alternate plans, the Travel type of search advertisements or search strings are changed accordingly. Now, for the user Intent type-3, the Travel intent is disappeared and the priority of the previously identified intents is changed as shown in 415. As the time of travelling approaches, user can also have a new intent, for example to book a taxi to the airport. This is identified under user Intent type-4, 420 and the intents can be Taxi, Visit places and Shopping. The prediction of user intents and type of advertisements and prioritizing the user intents and serving the advertisements at the right time is based on the contextual information, which is identified across one or more computing device applications, computing device hardware information, location of the computing device. user's previous and current text input and the like.

Similarly, in another instance, if the first user is texting from home with the second user about his plan for thanksgiving for example, "Hi, I am heading home for thanksgiving. Can't wait to visit Eiffel Tower with the kids. And a movie treat for them at the local cinema house. Time flies." Based on the context input by the first user, first user's intent can be predicted. In addition to this, the recommendation engine of the present invention can also predict user's intent and persona based on the contextual information obtained from user's interaction with one or more computing device applications, computing device's information, which can be current or historic, for example, current context, historic context, current location, destination location, user's derived intent, user's preferences, time of travelling, historic context across all the applications/softwares, and can serve relevant type of search advertisements or search strings to user at the current time inputting text in a search editor of an application or any editor of any application of computing device or in future when the first user is inputting text related to context like travel, movie, Eiffel Tower and the like in search editor or any other editor, of a browser, a messenger application, a computing device application, etc till the time user reaches destination or till the time the plan for thanksgiving approaches. The search advertisements related to travelling, touring packages, movie tickets, stores, offers available near the destination location, offers available during travelling and the like can be few example of type of search advertisements served to user. The contextual information identified from the user's computing device can be stored on computing device and/or on server and is combined or compared with the contextual information, that is identified from the all the user's of the invention of the present application and stored on the server, to identify the type of search advertisements or the type of search stings that is commonly served for a particular type of contextual information and served to the current user at right time. FIG. 5 illustrates a view on type of contextual information captured when the first user is texting with the second user as per the current scenario. The current location of the user's device, which is Scotland, is identified based on device's Global Positioning System (GPS), location of destination, which is Paris city, is identified based on user's text input (Paris location is considered primarily as Eiffel tower is located in Paris city), analyzing messaging content to retrieve any travel information, past travel information at the time of thanksgiving and past activities at user's destination location are also considered to serve search advertisements. However, it is not limited to serve search advertisements, the recommendation engine of the present invention can also serve content which can be text, audio, video, computing device application/software, contextual services like notifying user about upcoming user's events, climatic condition of user's location which is identified by location of user's computing device, calendar events, conference, etc.

The search advertisements served to user can be travelling related advertisements like train or bus related advertisements, offers if there is no airport in first user's destination at the time of travelling. If there is an airport, flight related ads, can also be provided. These types of advertisements can be prioritized based on user's historic contextual information. Also, if user's destination is very close to airport, based on user' age, health condition, preference, mood, cab related ads are provided. Apart from these advertisements, advertisements related to stores which are available near to destination location, Eiffel Tower in this context can be provided to user and also advertisements related to movie tickets website or theatres which are close to destination location can be provided. The advertisements can be changed dynamically, on timely basis, user's contextual information, user's preference and served to user till user reaches destination. For example, if user receives initially advertisements related to travelling to reach destination location and receives advertisements related to bus travels or cab travels but later on as the weekend approaches, if there is any offer introduced newly with respect to bus travels or cab travels, the advertisements are changed dynamically and new advertisements are served to user. Also, the advertisements are changed dynamically if there is any offer related to flight fare is available at that moment. Such advertisements on flight fares are served dynamically based on user's budgeted amount information for the weekend trips, user's intent, user's behaviour, mood, sentiment, which is obtained from user's recent and past activities across multiple device applications/softwares. One such activity can be user's input across multiple device applications/softwares. In another instance, initially, the advertisements related to travelling may be served to user but these may get changed to travelling or packages or other advertisements related to destination location and the like when the travelling time approaches. Also, advertisements based on user's persona are served. In the current context, when user is approaching the destination location and user is happy with products that are at fewer prices, advertisements on offers on products which are available to user's device location at that moment are served to user. For instance, user has travelled by flight to reach destination and during the time of travel and at the time of reaching the destination airport, user can get advertisements on discount on products which are available at duty free liquor shop. However, these advertisements are changed dynamically based on user's behaviour and persona. When user is interested in luxury products, in this particular case, an advertisement related to a luxury liquor product can be served to user. In another instance, before user booking the tickets for travelling, based on user's behaviour and persona, luxury or less price travelling advertisements are served. Further, the advertisements can be changed on time frame basis, for instance, same advertisements or search strings can be served to user for a time frame which could be a day, a week, a month, a quarter of a year till the user approaches the travelling plan or till user reaches the destination location. Once the time frame is expired another advertisement/search string can be served to user for a time frame as discussed.

If multiple advertisers are associated with the identified contextual information, the device-server ranking system, as discussed above, is associated with the contextual information to display one advertisement at a time to user. However, it is not limited to display only one advertisement to user; user can view more than one advertisement at the display unit.

Search advertisements are the advertisements which are served to user when user is using an editor belonging to a search engine or a browser and like. Search strings are the suggestions or strings, which upon user' access, opens a webpage, an application, a blog, a text content, an audio content, a video content, an image, a service and like. However, it will be appreciated that the recommendation engine of the present invention is not limited to serve search advertisements; it can be of any type of advertisements.

Figure 6A:
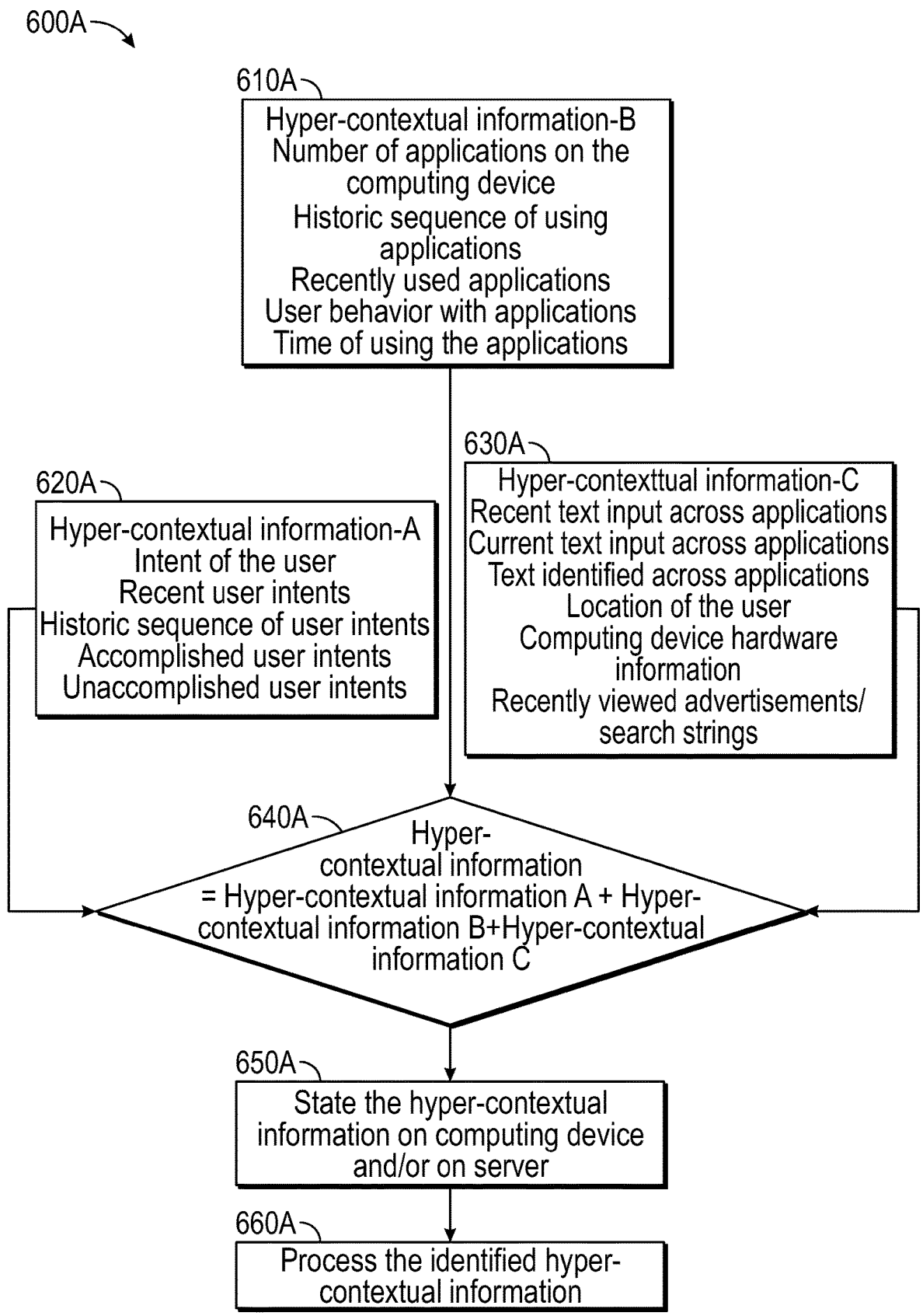
FIG. 06A illustrates a process flow diagram for identification of contextual information.
Figure 6B:
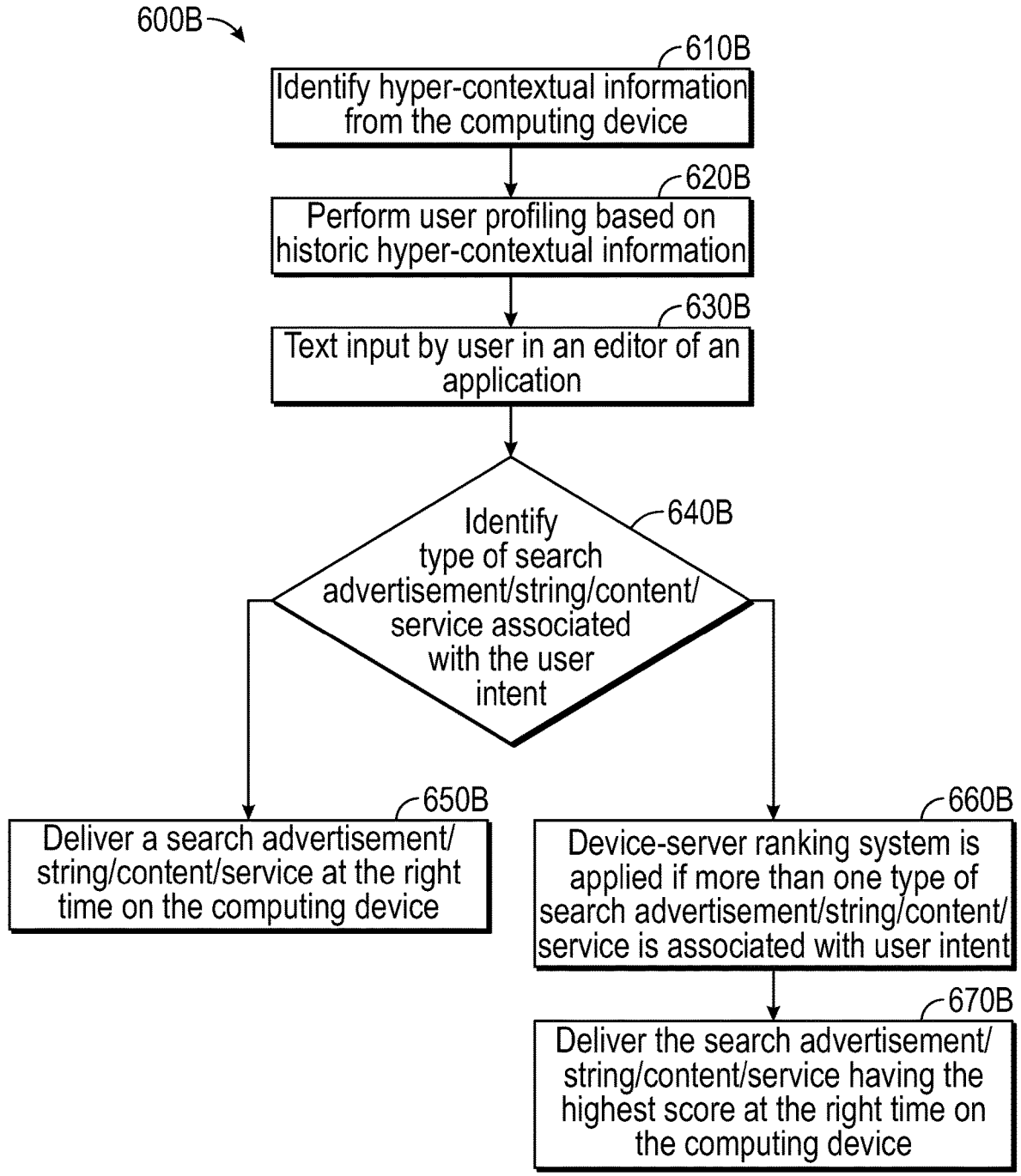
FIG. 06B illustrates a process flow diagram for serving search advertisement/search string.

The above discussed embodiments follow processes as illustrated in FIG. 06A, FIG. 06B, FIG. 07 and FIG. 08. FIG. 06A illustrates a flowchart 600A on identifying and processing the contextual information from a computing device. The contextual information is categorized into three different types based on the type of data available on the computing device. The three types are shown in the FIG. 06A as 610A, 620A and 630A. The contextual information A 620A is determined based on user intents. The factors of the user intent includes but not limited to user intent, recent user intents, historic sequence of user intents, accomplished user intents, unaccomplished user intent. The contextual information B 610A is determined based on computing device applications or softwares implemented on the user's computing device. The factors of the computing device applications or softwares includes but not limited to number of applications on the device, historic sequence of using the applications, recently used applications, user behaviour with the applications, time of using the applications. The contextual information—C 630A is determined based on Text input and computing device hardware information. The factors of the contextual information—C includes but not limited to recent text input across one or more applications, current text input across one or more applications, text identified across one or more applications, location of the user, recently viewed/selected advertisements or search strings and computing device hardware application. The identified contextual information A, B and C is combined to consider as the contextual information of a computing device 640A. The identified information can be stored on the computing device or on the server as in step 650A for processing. FIG. 06B illustrates a flowchart 600B on serving advertisements or search strings to user. The identified contextual information 610B is process to perform user profiling 620B. When the next time user inputs text, by any means, in an editor of an application or a browser or a search bar, a type of search advertisement or search string is predicted based on the identified contextual information and serves a relevant search advertisement or search string to user at the time. If more than one type of search advertisement/search string is associated with the identified contextual information, the system of the present invention uses device-server ranking system to identify the search advertisement or search string having a highest score and serves at the right time on the computing device.

Figure 7:
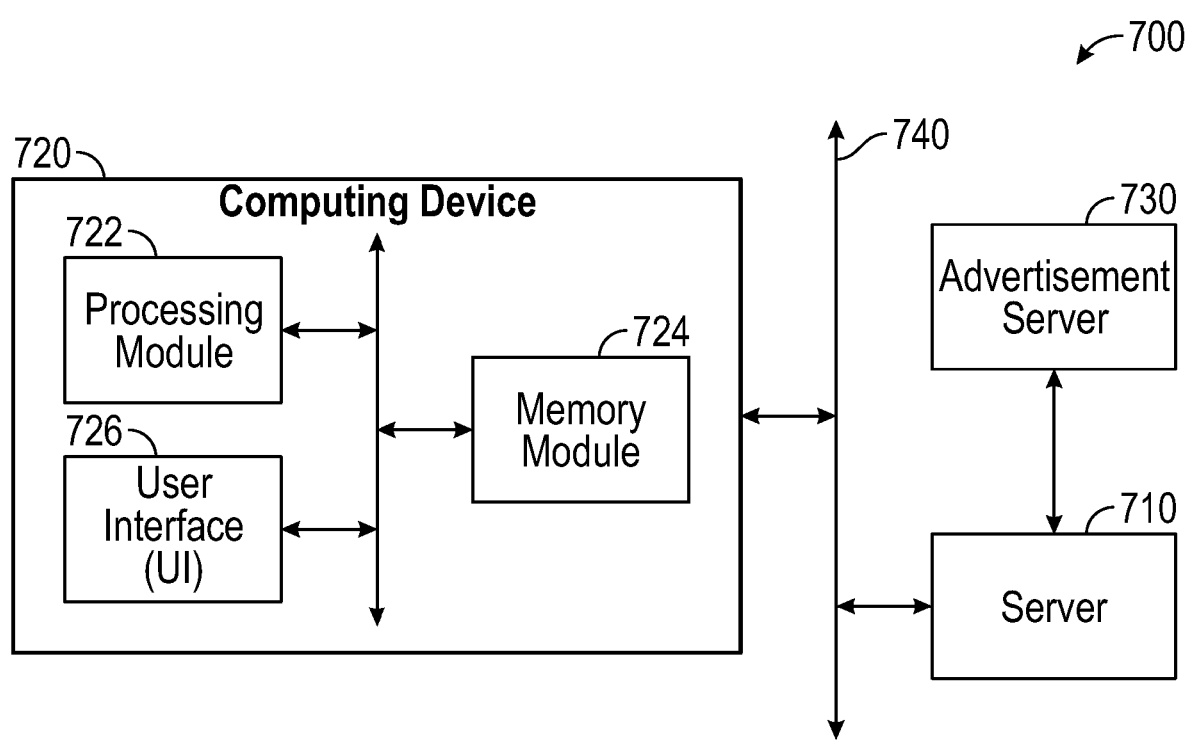
FIG. 07 illustrates a block diagram of an exemplary system for facilitating contextual information in accordance with an embodiment.

FIG. 07 illustrates a block diagram of an exemplary system 700 for providing advertisements in accordance with an embodiment. The system 700 includes a server 710, for example a data serving server and at least one client for example, a computing device 720. The server 710 is configured to receive information for serving an advertisement at the computing device 720. In an embodiment, the server 710 is configured to receive information such as uniform resource identifiers (URIs), application programming interface (APIs) associated with queries, keywords, phrases, hyper-context, search context, promotional messages, images, icons and the like associated with respective services and products from the advertisement server 730. In various embodiments, the advertisement server 730 is further configured to provide updates associated with the information to the server 710. In an embodiment, the server 710 is configured to receive said information from the advertisement server 730 by allowing the advertisement server and/or advertisers to log-in to the server 710, and subsequently providing advertiser credentials. In another embodiment, the server 710 is configured to receive said information from the advertisement server 730 by accessing the advertisement server 730 (for example, based on access information). In an embodiment; the advertisement server 730 is configured to provide the information to the server 710 in a predetermined format.

In another embodiment, the server 710 is configured to allow the advertisers to log-in to the server 710 based on advertiser's credentials, and provide the mapping of keywords/phrases/hyper-context with device-server ranking system and APIs, sentences/questions, icons, images, promo messages, queries and the like. In this scenario an advertisement server 730 is not required since herein, the server 710 facilitates a direct communication with the advertisers, thereby precluding a need of advertisement server 730 in the system 700.

In an embodiment, the server 710 may be any kind of equipment that is able to communicate with the advertisement server 730, the at least one client, for example, the computing device 720 and/or advertisers. Accordingly, in an embodiment, a device, such as a communication device (for example, a mobile phone) may comprise or include a server connected to the Internet. In an embodiment, the server 710 may communicate with the client by means of a communication path, for example a communication path 740. In an embodiment, the communication path linking the at least one client, for example, the computing device 720 and the server 710 may include a radio link access network of a wireless communication network. Examples of wireless communication network may include, but are not limited to a cellular communication network. For example, the server 710 and the computing device 720 may be configured to communicate with each other using at least one of a plurality of Institute of Electrical and Electronics Engineers (IEEE) 802.11 protocols. Examples of IEEE 802.11 protocols may include, but are not limited to, IEEE 802.11a, IEEE 802.11b, IEEE 802.11g, IEEE 802.11n and IEEE 802.11ac wireless LAN protocols and the like. It is also noted that the various components of the system 700 may also communicate with each other using non Wi-Fi protocols, such as Zigbee or sub-giga hertz network protocols, or using Bluetooth signals.

The communication path 740 may additionally include other elements of a wireless communication network and even elements of a wired communication network to which the wireless communication network is coupled. Examples of the wired connection may include cables, buses (for example a data bus or a control bus), optical conductors and the like.

The at least one client may include the computing device, for example the computing device 720, and is configured to receive a user input. The at least one client may also be configured totalize the context of the user input in the computing device to perform a contextual discovery and provide contextually relevant information, for example, advertisement and/or services. In an embodiment, the computing device is configured to determine the context of the user input based on keywords associated with the user input. Additionally or alternatively, it will also be appreciated that the context of the user input may be determined by, among other things, a location context (for example location of one or more participants associated with the user input), time context, application in use, conversation history of the user, user preferences and the like in the user input. Examples of the computing device 710 may include a (1) data processing device, such as a personal computer, a tablet computer and/or a laptop, (2) a communication device, such as a mobile device or a Smartphone, and the like (3) any other device communicably coupled with the computing device 710 by means of, for example, cloud, and the like.

In an embodiment, the contextual discovery may include determination of hyper-context sensitive home-screen for the computing device. In the present embodiment, based on a determination of time context, profile context, location context, content being consumed on the computing device, content being created on the device, text input analytics, search context, and the like different placeholders may be given for advertisements to be pushed into the computing device that may be contextually relevant and personal to the user. Additionally or alternatively, the contextual discovery may include a context sensitive widget presented on the home-screen of the computing device. The context sensitive widget may facilitate input of text from the user of the computing device. The context sensitive widget may further be configured to facilitate contextual discovery in the computing device based on time context, profile context, location context, content being consumed on the computing device, content being created on the device, text input analytics, search context and the like.

The client 720 includes a processing module 722, a memory module 724, and a user interface 726. The client 720 is configured to receive the user input by means of the user interface 726. In an embodiment, the user input may include text entry into any search editor of a web search engine or an application that has search field in the user interface 726 associated with the client 720.

The processing module 722 of the computing device 720 may be configured to perform a semantic analysis of the text input by user, and identify contextually relevant information (for example, advertisements). Additionally or alternatively, the processing module 722 is configured to identify a 'brand experience' based on the semantic analysis of the text input by the user. Examples of brand experience may include, but are not limited to shopping experience and relevant brand advertisements, eat-out experience and relevant brand advertisements, and the like. The 'brand experiences' may be embodied in form of applications and/or add-ons and provided in the computing device 720. For example, a brand experience associated with a social networking site may include a language dictionary, theme, lingo dictionary, and the like associated with the social networking site.

In an embodiment, the processing module 722 may be embodied as a multi-core processor, a single core processor, or a combination of one or more multi-core processors and one or more single core processors. For example, the processing module 722 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processing module 722 may be configured to execute hard-coded functionality. In an embodiment, the processing module 722 is embodied as an executor of software instructions, wherein the instructions may specifically configure the processing module 722 to perform the algorithms and/or operations described herein when the instructions are executed. The processing module 722 may include, among other things, a clock, an arithmetic logic unit (ALU) and logic gates configured to support an operation of the processing module 722.

The memory module 724 of the computing device 720 includes pre-loaded data. The memory module 724 is configured to receive the pre-loaded data from the server, for example, the server 710. In certain embodiments, the pre-loaded data may include brand experiences and/or advertiser information. Examples of the memory module 724 may include, but are not limited to, random access memory (RAM), dual port RAM, synchronous dynamic RAM (SDRAM), double data rate SDRAM (DDR SDRAM), and the like. The pre-loaded data may be provided by the server 710. In an embodiment, the pre-loaded data may be provided to the memory module 724 of the computing device 720 by means of offline upload and updating of the information in the computing device, thereby-precluding a need of accessing the internet while the user provides the user input.

The user interface 726 of the client 720 may be configured to present a notification upon identification of contextually relevant data associated with the text input by the user. In an embodiment, the user interface 726 may include a user interface circuitry and user 41) interface software configured to facilitate a user to control at least one function of the electronic device through use of a display and further configured to respond to user inputs. In an example embodiment, the computing device 720 may include a display circuitry configured to display at least a portion of the user interface of the computing device 720. The display and display circuitry may be configured to facilitate the user to control at least one function of the computing device 720.

It will also be appreciated that the UI 726 may provide the notification, for example an advertisement, when the user is forward typing or when the user navigates to any part of the text in a search editor field. As used herein, the term 'forward typing' may refer to the scenario when the user input the text into any search editor. As the user provides the input, the semantic relevance of what the user is inputting is analyzed dynamically. The semantic sense thus derived while providing the user input identifies the relevant paid/free services from the pre-loaded data. Upon identification of the semantic sense and a service, the notification may be provided to the user by means of the UI 726. Also, the term 'navigation mode' may refer to the scenario when the user moves a caret/cursor into any search editor. In an embodiment, there may be multiple derivations of semantics in the navigation mode.

The user interface 726 is further configured to display the relevant pre-loaded data corresponding to the semantically identified information based on the user action (for example, when the user taps on the key). In an embodiment, the relevant pre-loaded data may be made available to the user as a free service. In alternate embodiments, the relevant pre-loaded data may be made available to the user as paid services.

Figure 8:
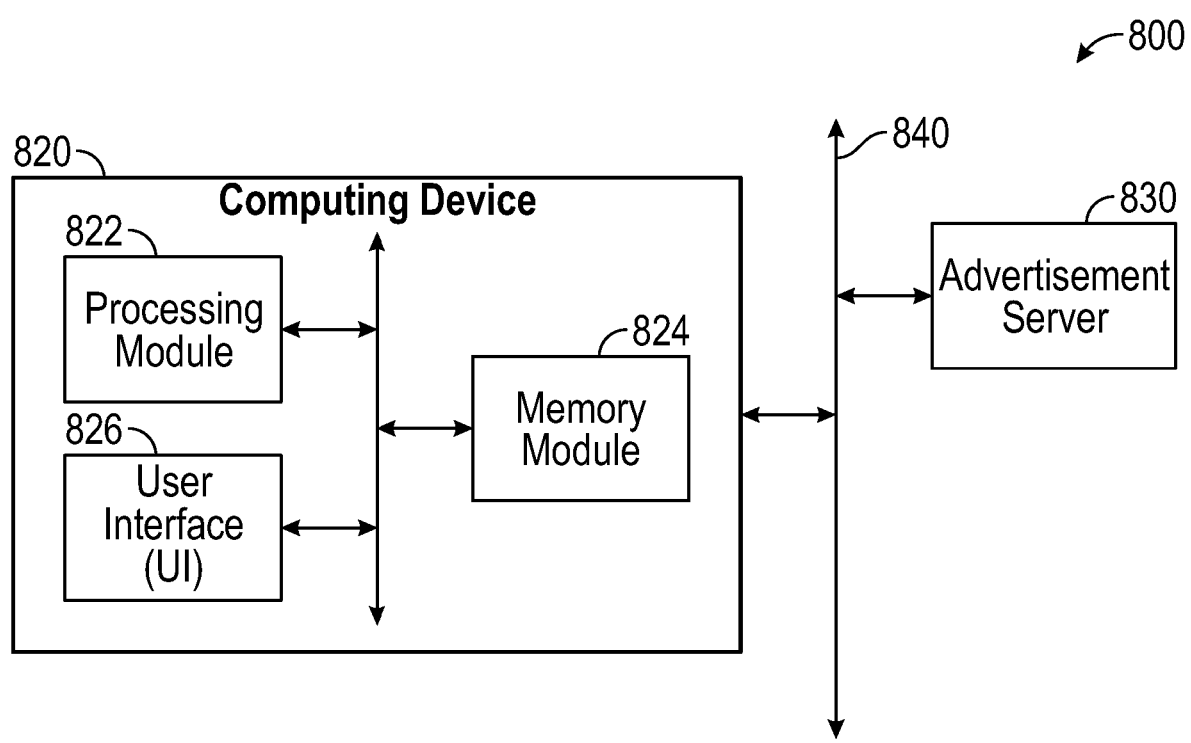
FIG. 08 illustrates a block diagram of an exemplary system for facilitating contextual information in accordance with an embodiment.

In another embodiment, as illustrated in FIG. 08, an advertising server, 830 can be a server operated by a third party advertising provider which maintain data by their own means. The server 830 is connected to the computing device 820 by communication path 840, which may be wire/wireless. For example, the server 830 and computing device 820 may be configured to communicate with each other by various types of internet protocols, which are described above. The computing device 820 and the advertising server 830 may be similar to the respective components explained with reference to the FIG. 08. The process for providing contextual information to advertising server 830 may be performed in real-time or in intervals. The third party advertising providers serves advertisements, at UI 826, once they identify the text entered so far in the search editor and correlate said text with the data maintained and, operated at server 830 by such advertising providers. These advertising providers may/may not use the contextual information aggregated by the recommendation engine of the present invention.

In another preferred embodiment, the present invention includes a first user has texted with a second user using chat application/software about a plan to go for a movie or posted about his movie plan on a social networking application using a keyboard integrated with recommendation engine or the computing device itself is implemented with recommendation engine, and opened an application related to movie reviews, movie genre and like. Now the first user is planning to enter input in a search editor to find out a way to book the tickets for a movie of his interest, at this point when the first user has initiated the input process, the recommendation engine of the present invention identifies the information associated with recently used applications and content associated with the applications on the computing device and predicts intelligently user intent and identifies at least one type of search advertisement or type of search string to serve relevant search advertisement or search string to the first user. When predicting the user intent, the recommendation engine of the present invention also considers the current context like current location of the first user, current keyword input in the search editor and like. The present invention can also serve search advertisements or search strings even before user initiated the input process or opened the browser with keyboard in minimized mode. In another instance, once the first user has interacted with the chat application or social networking application to start a conversation with second user about the movie plan and then opened another application related to movie reviews or movie genre. The recommendation engine of the present invention predicts first user's intent based on the contextual information like text entered while having the conversation with second user, text received from the second user during the conversation, the names of the computing device applications and the sequence of opening the computing device applications, for example, the chat application followed by a movie review application, and immediately notifies user as a blob or icon on the display of the computing device. In another instance, the blob or icon can be displayed as a notification on the computing device, when user initiated the text entering process in an editor.

Upon accessing the blob or icon, first user can see one or more advertisements or search strings. As mentioned earlier, this embodiment is not limited to serving advertisements/search advertisements and search strings, this can also provide content, services, a URL, a sentence prediction, mood prediction, a computing device application or software. The recommendation engine of the present invention can also to serve advertisements/search advertisements, search strings, etc based on mood, intended phrase/string, intended sentence and the like.

Figure 9:
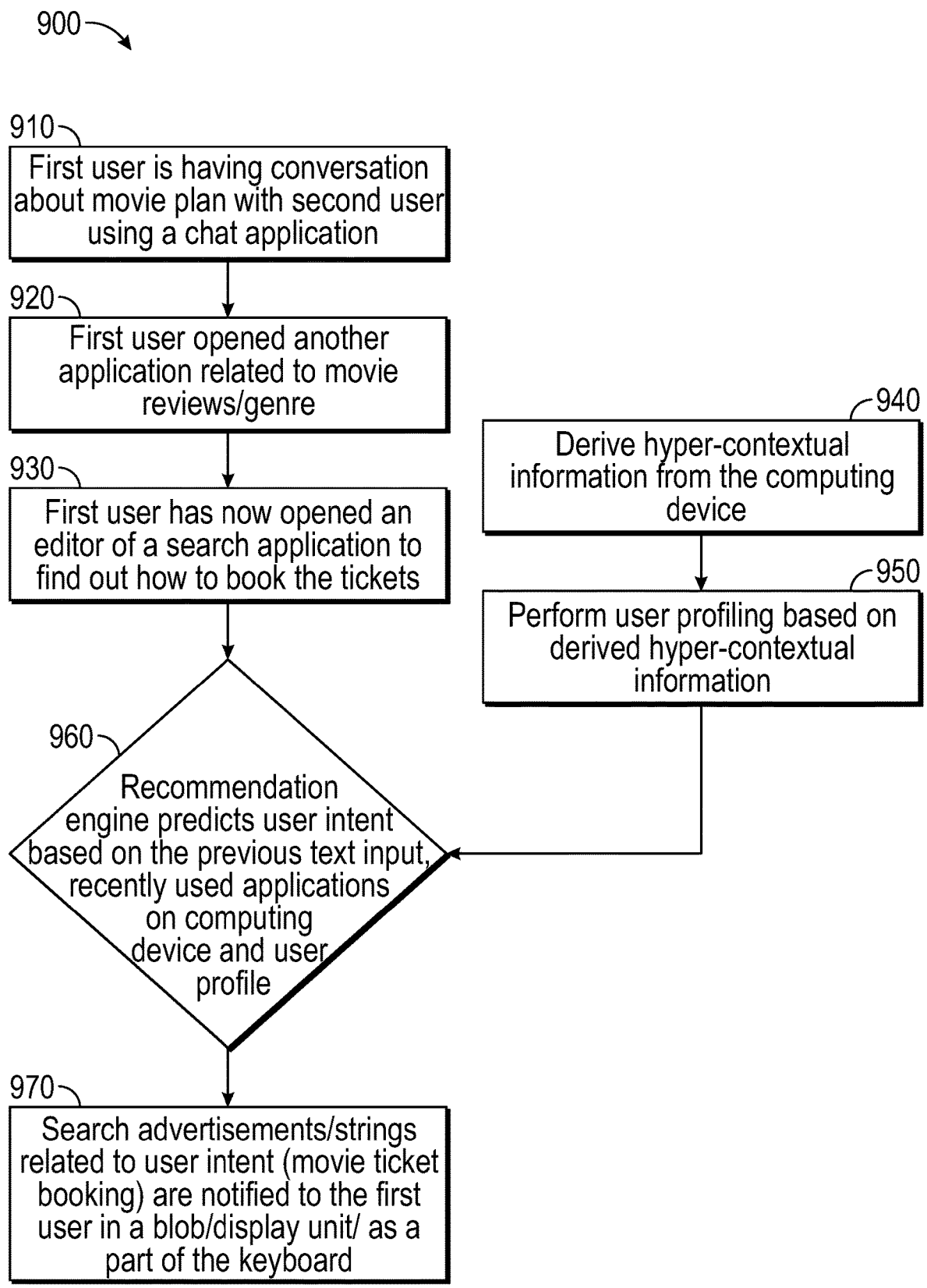
FIG. 09 illustrates a process flow diagram for serving search advertisement/search strings by considering context across one or more computing device applications.
Figure 10:
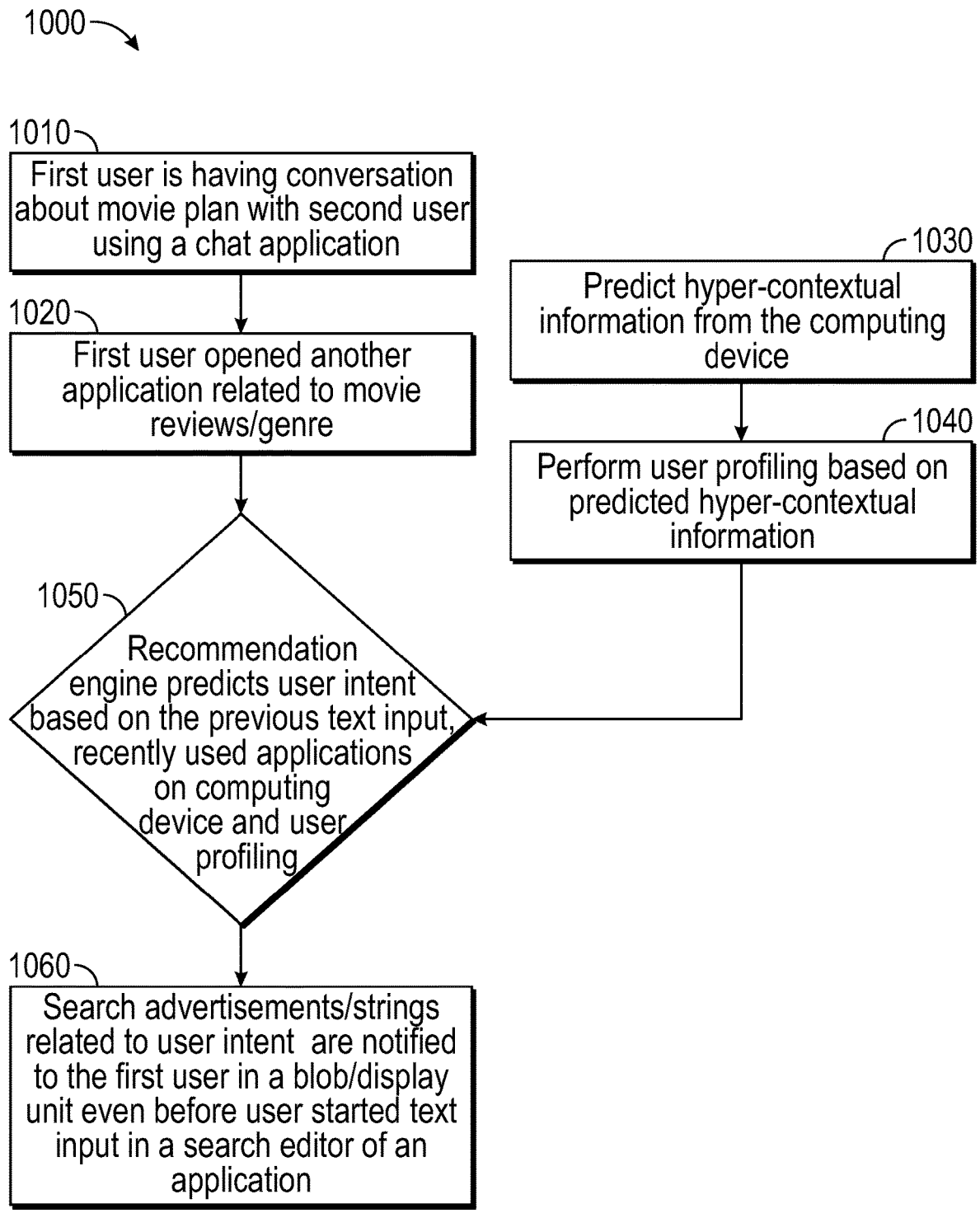
FIG. 10 illustrates a process flow diagram for serving search advertisement/search strings by considering context across one or more computing device applications.

FIGS. 09 and 10 illustrate flowcharts on the above process of providing the search advertisements or search strings when one or more computing device applications are involved.

Various embodiments of the systems and methods for providing contextual discovery to the users in real-time are described with reference to FIG. 11 to FIG. 22.

Figure 11:
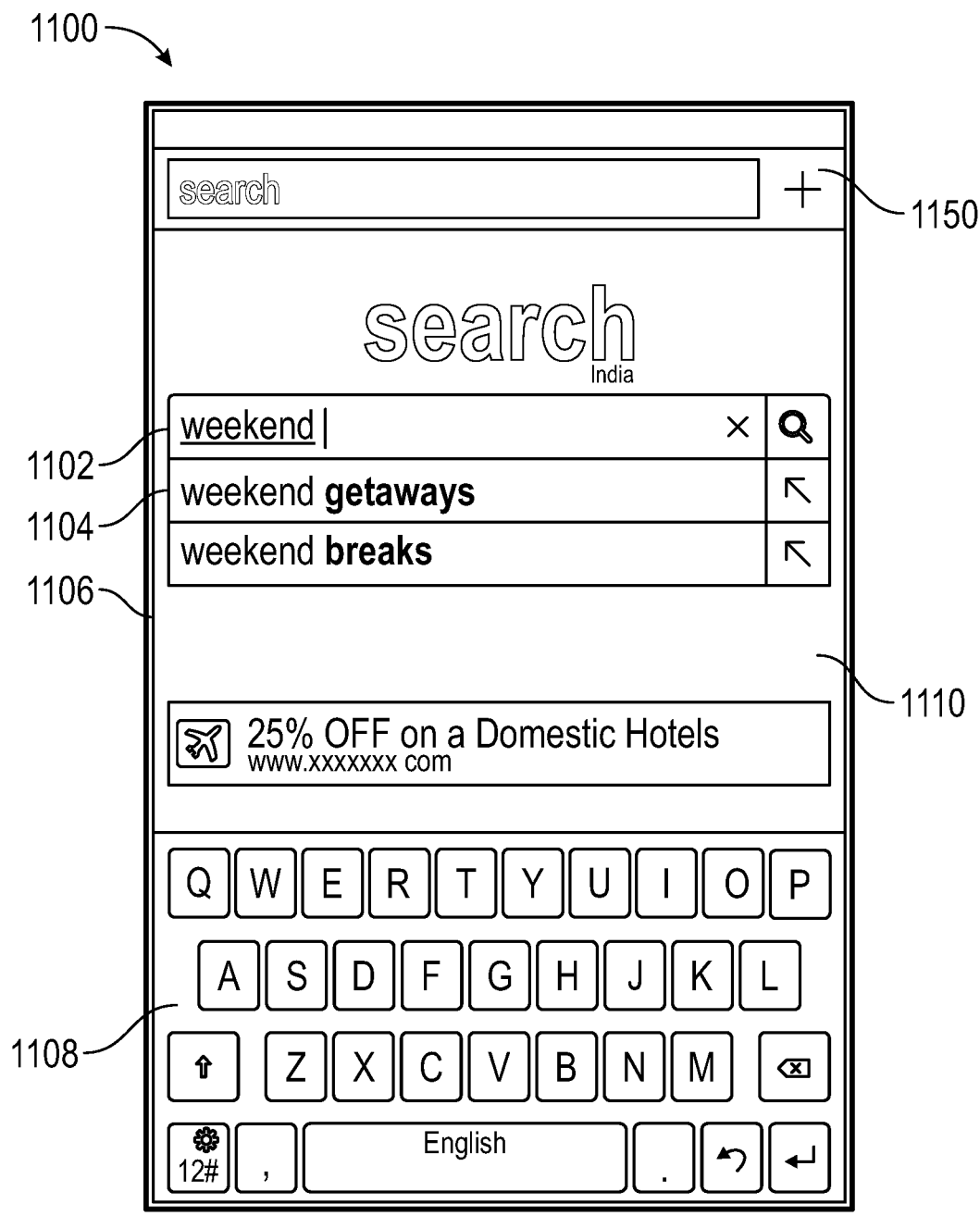
FIGS. 11 to 18 illustrates a screen shot of an exemplary contextual discovery application displaying exemplary graphical user interface in accordance with still another embodiment.

FIG. 11 illustrates a view 1100, when user is entering the text "weekend" in first language English in the search editor 1102 of a search engine of a browsing application on a computing device 1150 using a keyboard 1110 which is configured to the recommendation engine of the present invention. The keyboard 1110 has the ability of showing advertisements in the suggestion bar 1108 when the user is not searching for an advertisement using a search editor, as illustrated in co-owned Indian patent application number bearing PCT/IN2014/000113, but as per the present application, the keyboard 1110 is able to display advertisement 1112 when user is entering text in the search editor 1102, in this scenario, at least one discount offer from an advertiser, Fairtrip in the current illustration, is displayed to the user in a space 1106 provided just above the keyboard 1110 as shown in the FIG. 11. However it may not be limited to said space 1106, it can be anywhere on the screen in a form that is possible to display advertisement to user. In this particular embodiment, when user in entering text "weekend" in search editor 1102, typically the web search engine provides search strings 1104 as suggestions to user, based on information of user's behaviour captured by browser cookies among various WebPages and various browsers like Chrome™, Firefox® by capturing the text entered into search editor of various web search engines, clicking on advertisements on WebPages provided by various advertisement providers, historical information of WebPages visited by user, session information and the like. This type of cookie information can also be used to serve advertisements on a webpage. However, the recommendation engine of the present invention intelligently predicts user's intent and persona based on contextual information and serves advertisements in the region 1106. The hyper-contextual information is different from the cookie information, and it comprises of current or historic information of text entered in a search editor of a web search engine, text entered in any editor of an application and current or historic context across applications like social networking, messaging, notes, emails, and device metadata, location of the user, intent of the user, user's interaction with multiple applications on computing device, user's preferences, etc which is as discussed above. As per the current illustration, user might have texted with another user regarding his weekend trip, user might have posted his weekend plan on a social networking application or commented to someone's post on a social networking application, user might have interacted with computing device applications related to travelling, weekends. If multiple advertisements relate to the same contextual information, the advertisements are displayed on the display unit according to device-server ranking system as discussed above. The recommendation engine also has the capability to serve advertisements and/or search strings based on data aggregated by other third party advertisement providers in their own means, provided if the recommendation engine is integrated with the third party advertisement provider. It is also not limited to the word typed as "weekend", the recommendation engine has also the ability to serve advertisements if there is a typographical error typed by the user, a second language input which can be a language other than English, if there are relative keywords entered, for example, for the word "weekend", relative keywords can be "Saturday", "Sunday". The typographical errors can at least one type of an insertion, a deletion, a short form, acronym and like. These errors are corrected by integrating the advertisement prediction engine with language prediction engine. In another embodiment, the errors can also be corrected by learning the words/phrases used/entered/typed across different applications. If multiple words are suggested for one typographical error, a rank is provided such that the word having the high score is provided as a top suggestion and the advertisement associated with the word is provided further.

The factors like the first advertiser to buy, the advertiser who bought the word at high price, the advertiser who bought only rights for providing the advertisements for a particular word, for instance the word 'weekend' may be considered at the advertiser end. If there are multiple advertisers for a single word, a rank is assigned to each advertiser based on the price and rights given to an advertiser. In the light of FIG. 11, for example if the word 'weekend' may be purchased by a company, Fairtrip, and considering all the factors described above, at least one advertisement is displayed to user in the region 1106 to user. Upon accessing the advertisement, the process is redirected to a Webpage of the advertiser. It may not be limited to a Webpage but it can also be a video from the advertiser, an image displaying further details, a voice output and the like.

The contextual information is useful not only to provide advertisements while entering text in a search editor of a web search engine but also provides advertisement while entering text in a search editor of a third party application/software other than web search engine, which is explained below using FIG. 15.

Figure 12:
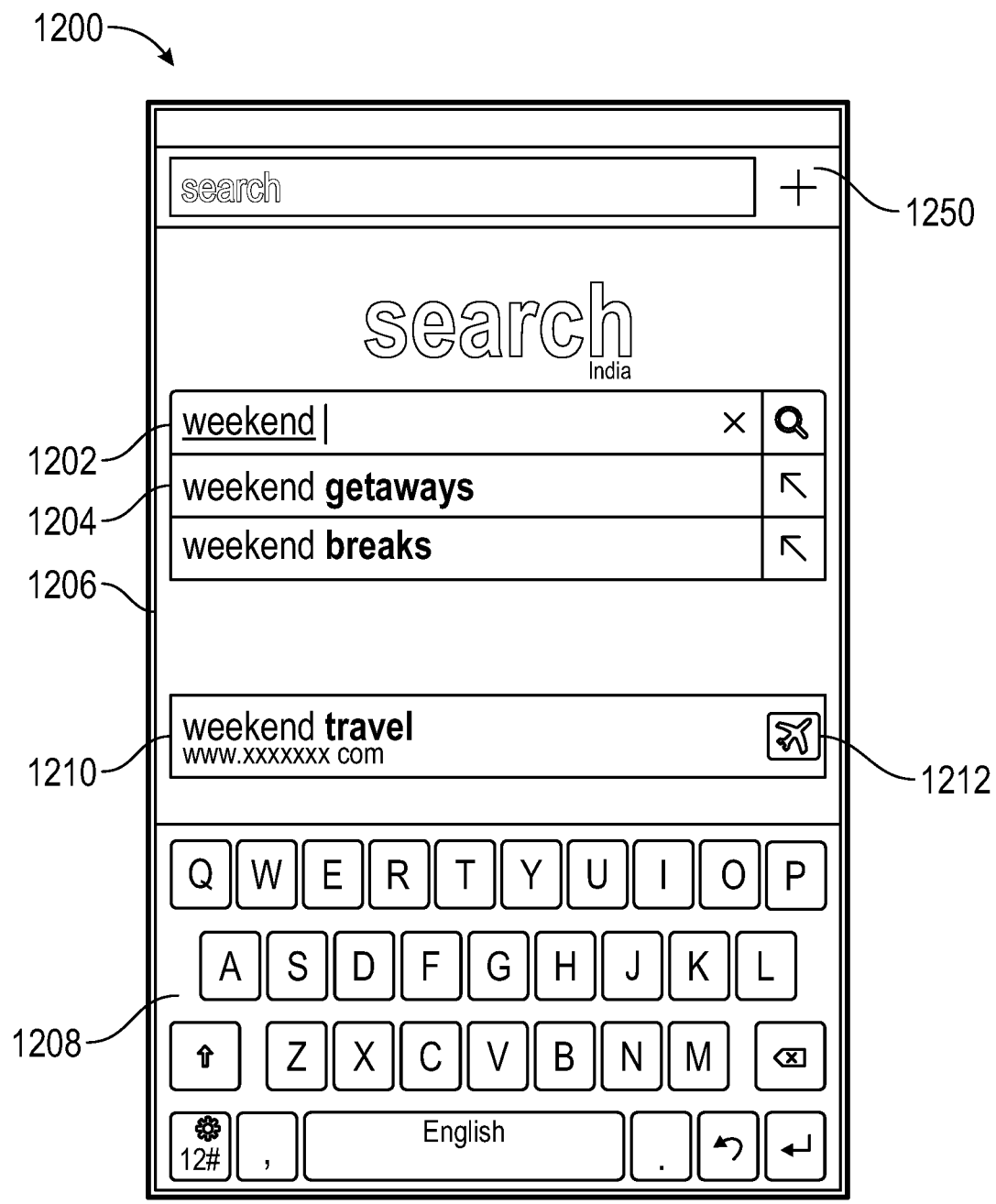

Referring now to FIG. 12, the sponsored search string 1210, from Fair trip 1212, is served to user in the region 1206 by the recommendation engine of the present invention before user is completing the sentence in the search editor 1202 using the keyboard 1208 of the user computing device 1250. The user has entered text "Weekend" in the search editor and the search engine that is integrated with the browser application/software is providing search strings 1204. The recommendation. engine of the present invention intelligently predicts user's intent and persona based on the user's contextual information derived from user's interaction with multiple computing device applications/softwares and the current context input. As per the teaching of the present invention, a processing module along with a memory module associated with the computing device 1250 can intelligently predict the intent and serve search string when user hasn't entered a keyword in the search editor 1202. In the current scenario, user might have texted with another user regarding his weekend trip, user might have posted his weekend plan on a social networking application or commented to someone's post on a social networking application; user might have interacted with computing device applications related to travelling, weekends. Based on such contextual information, search string 1210, from Fair trip 1212 is served to user at the display region 1206. The served search string can be changed dynamically if multiple sponsors are registered for one keyword or contextual information. In that case, device-server ranking system as discussed above, is used in combination with contextual information to serve the search string that is relevant to user's intent on the display unit of user computing device.

The sponsored search string can be served to user even before user has initiated the text-input process based on user's recent interaction with multiple computing device applications/softwares. For instance, user performed an input activity using a messenger application/software and discussed with another user on travel type, relocation type. etc: and user has interacted with application/softwares related to travelling, weekend and the like. It has to be noticed that the recommendation engine in this embodiment is not limited to a keyboard application, but also be provided as a source code, a script, plug-in and the like to any third party application that can aggregate data. Upon accessing the search string, user may redirected to webpage of the sponsor, a specific webpage of the sponsor, an application/software may be installed on the user's device, a video may be displayed and the like.

Similar implementations of recommendation engine of the present invention are illustrated from FIGS. 13 to 22.

Figure 13:
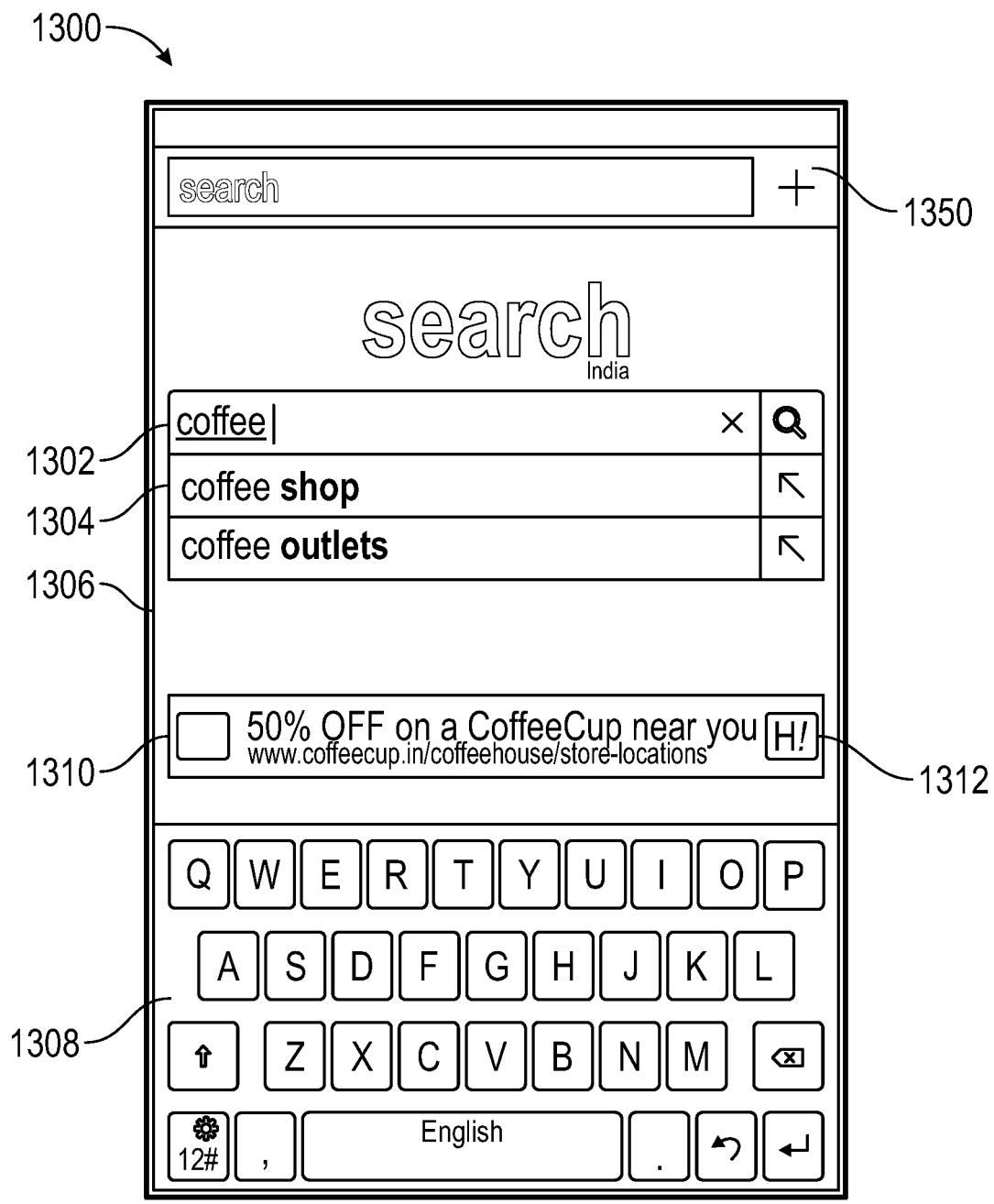

In a particular embodiment, the recommendation engine of the present invention, as a keyboard application is configured to a third party advertisement provider, for example, Hayoo. Referring now to FIG. 13, the advertisement, from CoffeeCup 1310, is served to user in the region 1306 by Hayoo, which is represented as 1312 in the FIG. 13 before user is completing the sentence in the search editor 1302 using a keyboard 1308 of the user computing device 1350. Third party advertisement providers can provide at least one advertisement based on data collected so far using their own means. Also, they can use the contextual data captured by recommendation engine of the present invention to combine with their own data to serve such advertisements in the region 1306. It has to be noticed that the recommendation engine in this embodiment is not limited to a keyboard application, but also be provided as a source code, a script, plug-in and the like to any third party application that can aggregate data.

Figure 14:

Yet in an another embodiment, the recommendation engine of the present invention, as a keyboard application is configured to a third party search strings provider, as said example, Hayoo. Referring now to FIG. 14, the search string, "coffee vending machine" 1410 is served to user in the region 1406 by Hayoo, represented as 1412 before user is completing the sentence in the search editor 1402. Third party search string providers can provide such information to user on the user's computing device 1450 based on data collected so far using their own means or can use the contextual data captured by recommendation engine to combine with their own data to display such search strings. It has to be noticed that the recommendation engine in this embodiment is not limited to a keyboard application, but also be provided as a source code, a script, plug-in and the like to any third party application that can aggregate data.

Figure 15:
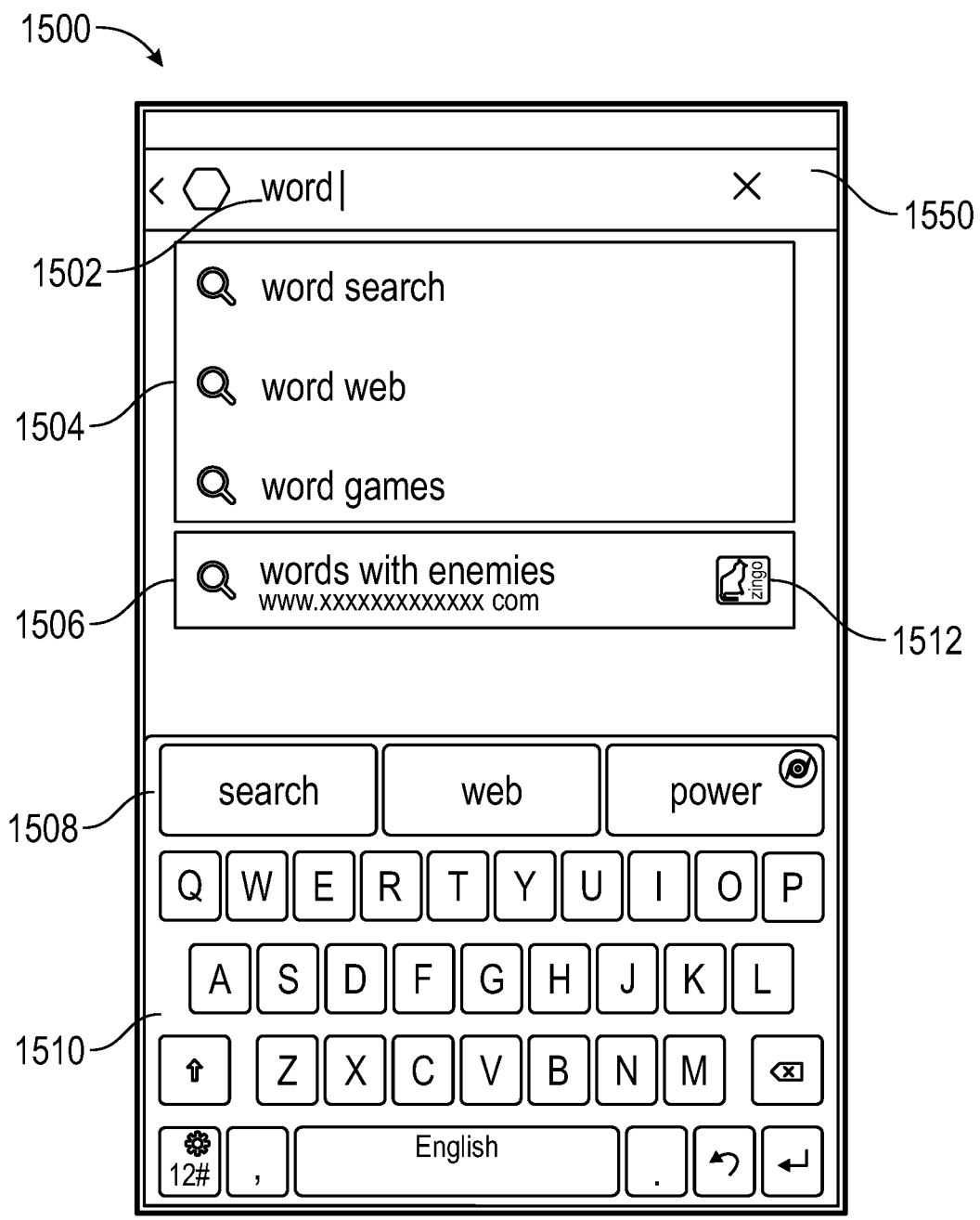

FIG. 15 illustrates, a user is entering text in a search editor of a third party application store or an online store for computing device applications. The third party application is different from web search engine as it serves search strings of products/applications that are present only in the store but do not provide any external search strings/links unlike a Web search engine. When a user enters a text 'word' in the search editor 1502 using the keyboard 1510 on a computing device 1550 to find out any computing device applications/softwares that are related to the text 'word' the recommendation engine of the present invention identifies the text entered so far by the user in the search editor and as discussed above, the process module along with the memory module associated with the user's computing device 1550 may identify relevant contextual data, discussed above, associated with the user input by means of keywords of the text 'word'. Upon identification of relevant contextual data of the user input, the advertising server identifies at least one sponsored search string and serves at least one sponsored search string in the region 1506 by correlating the identified contextual data with other factors, if any, like first advertiser to buy, advertiser who bought the word at high price and the like. If there are multiple sponsors are registered for a search keyword or search contextual information, the advertisements are displayed on the display unit according to at device-server ranking system as discussed above. Thereafter, the sponsored search strings are displayed at the UI of user's computing device. In the present scenario, based on contextual data and the keyword 'word', which is bought by an advertiser, for example Zinga, a sponsored search string 1512 is provided in the region 1506 to the user. Upon accessing the search string, the process is redirected to a Webpage of the advertiser. It may not be limited to a Webpage but it can also be a video from the advertiser, an image displaying further details, installing an application, a voice output and the like. Also, it has to be noticed that the recommendation engine can also provide search strings when user is typing text in search editor of the computing device application store and provide an advertisement or sponsored content associated with a word, shown as 1508 of FIG. 15 of the present application and as described in the in co-owned Indian patent application number bearing PCT/IN2014/000113.

It is not limited that user can receive advertisements or deals of products hosted/put for sale of an e-commerce webpage when user is entering text in search editor of the e-commerce webpage. For example, if user is entering text 'television' in a search editor of a first e-commerce webpage, user may receive advertisements or deals of products hosted/put for sale inside the first e-commerce webpage. It will be appreciated that advertisements of products hosted for sale inside a second e-commerce webpage may be provided in the notification region to user when user is entering text in search editor of the first e-commerce webpage. Providing such advertisements is based on factors like contextual information, advertiser who bought the keyword for providing advertisement, advertiser who bought the rights for providing advertisements when user is entering text in search editor of a particular e-commerce webpage. The advertiser here can be an owner of product, owner of first e-commerce webpage, owner of an e-commerce webpage other than first e-commerce webpage. It is not limited to providing advertisements but the recommendation engine can also provide search strings to guide user. Upon clicking on the search string, allows user to open an application, to participate in an event, to open a specific feature of an application, open a webpage on device with specific page results and the like.

Figure 16:
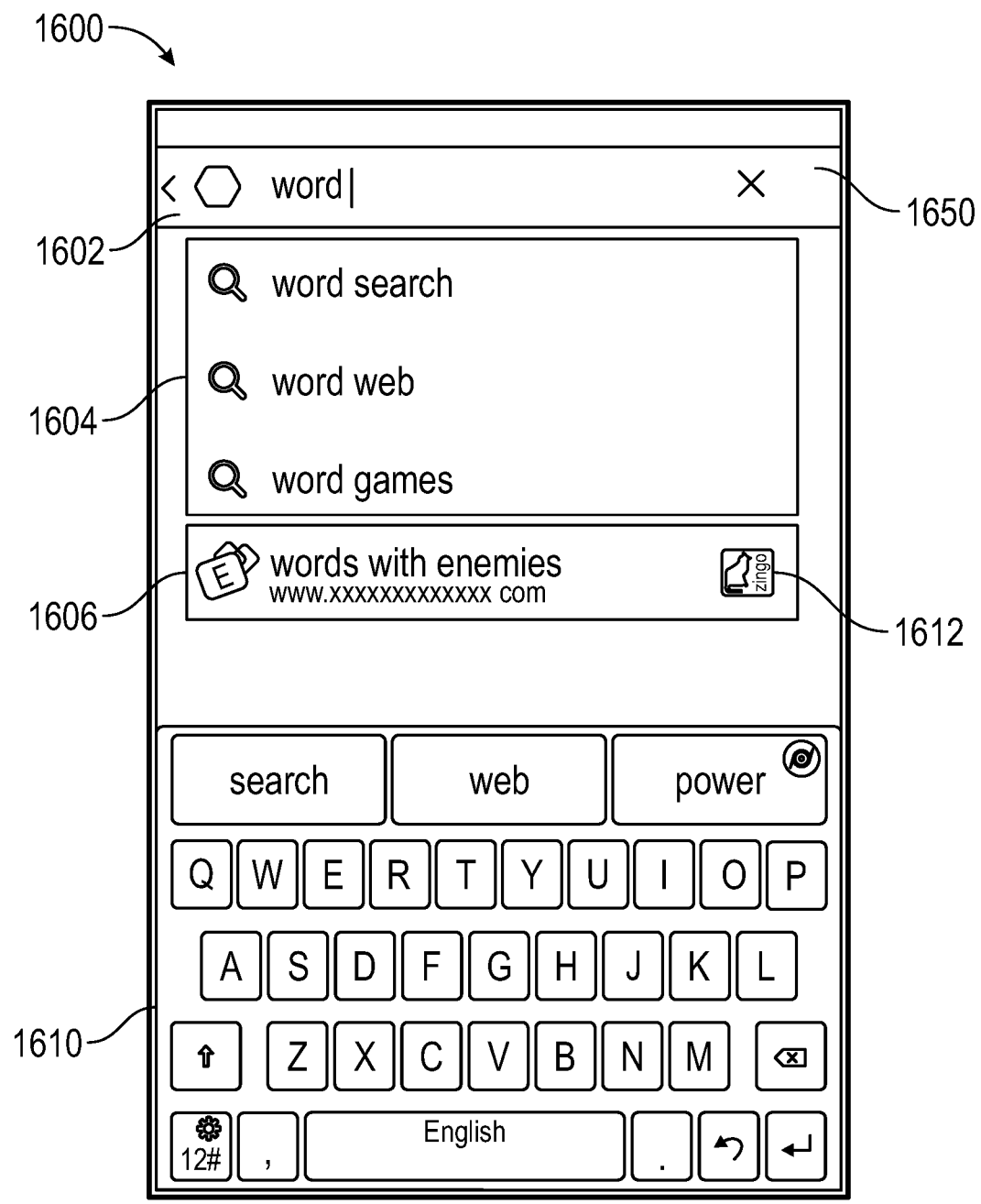

FIG. 16 illustrates, a user is entering text in a search editor of a third party application store which is an online store for computing device applications. The third party application is different from web search engine as it serves search strings of products/applications that are present only in the store but do not provide any external search strings/links unlike a Web search engine. When a user enters a text 'word' in the search editor 1602 using the keyboard 1610 on a computing device 1650 to find out any computing device applications/software that are related to the text entered "word". The recommendation engine of the present invention identifies the text entered so far by the user in the search editor and as discussed above, the process module along with the memory module associated with the user's computing device 1650 may identify relevant contextual data, as discussed above, associated with the user input by means of keywords of the text 'word'. Upon identification of relevant contextual data of the user input, the advertising server identifies and serves search advertisement in the region 1606 by correlating the identified contextual data with other factors, if any, like first advertiser to buy, advertiser who bought the word at high price and the like. If there are multiple advertisers are registered for a search keyword or search contextual information, the advertisements are displayed on the display unit according to at device-server ranking system as discussed above. Thereafter, the search strings are displayed at the display unit of user's computing device. In the present scenario, based on contextual data and the keyword 'word', which is bought by an advertiser, for example Zinga, the search advertisement 1612 is provided in the region 1606 to the user, In this case, the advertisement is an application/software called "Words with enemies" is served to user. Upon accessing the search advertisement, the application/software can be installed onto the user's computing device. It may not be limited to installing an application/software but it can also be a Webpage of the advertiser, an image displaying further details, a voice output and the like. Also, it has to be noticed that the recommendation engine can also provide search strings when user is typing text in search editor of the computing device application store.

As discussed above, the present invention is not limited to serve advertisements or search strings. It can also serve URL, service, image, video, a provision to install computing device application and the like. One such scenario is serving URL based on identified contextual information across user's one or more computing device applications. For example, if first user has texted with second user using chat application/software about a plan to go for a movie or posted about his movie plan on a social networking application using a keyboard integrated with recommendation engine or the computing device is implemented with recommendation engine, and opened an application related to movie reviews, movie genre and like. Now the first user is planning to enter text in a search editor to find out a way to book the tickets for a movie of his interest. At this particular stage, the recommendation engine of the present invention captures the entire first user's previous text input information, first user's interaction with all computing device's application information and interaction with movie related application information and intelligently predicts first user's intent and serve a URL for booking a ticket of a movie belonging to particular genre of what user is looking for in the respective notification region to user. The system and method of the present invention can also notify user using a contextual discovery key, as described above, when the said key is integrated on the keyboard and said keyboard is integrated with the recommendation engine of the present invention. Also, the contextual discovery key can act as a blob without any correlation with the keyboard and the blob can be moved to any area on the screen of the computing device upon user's touch interface. However, this example is not limited to serve only URLs but also to serve search advertisements, search strings, type of content, services, etc.

Figure 17:
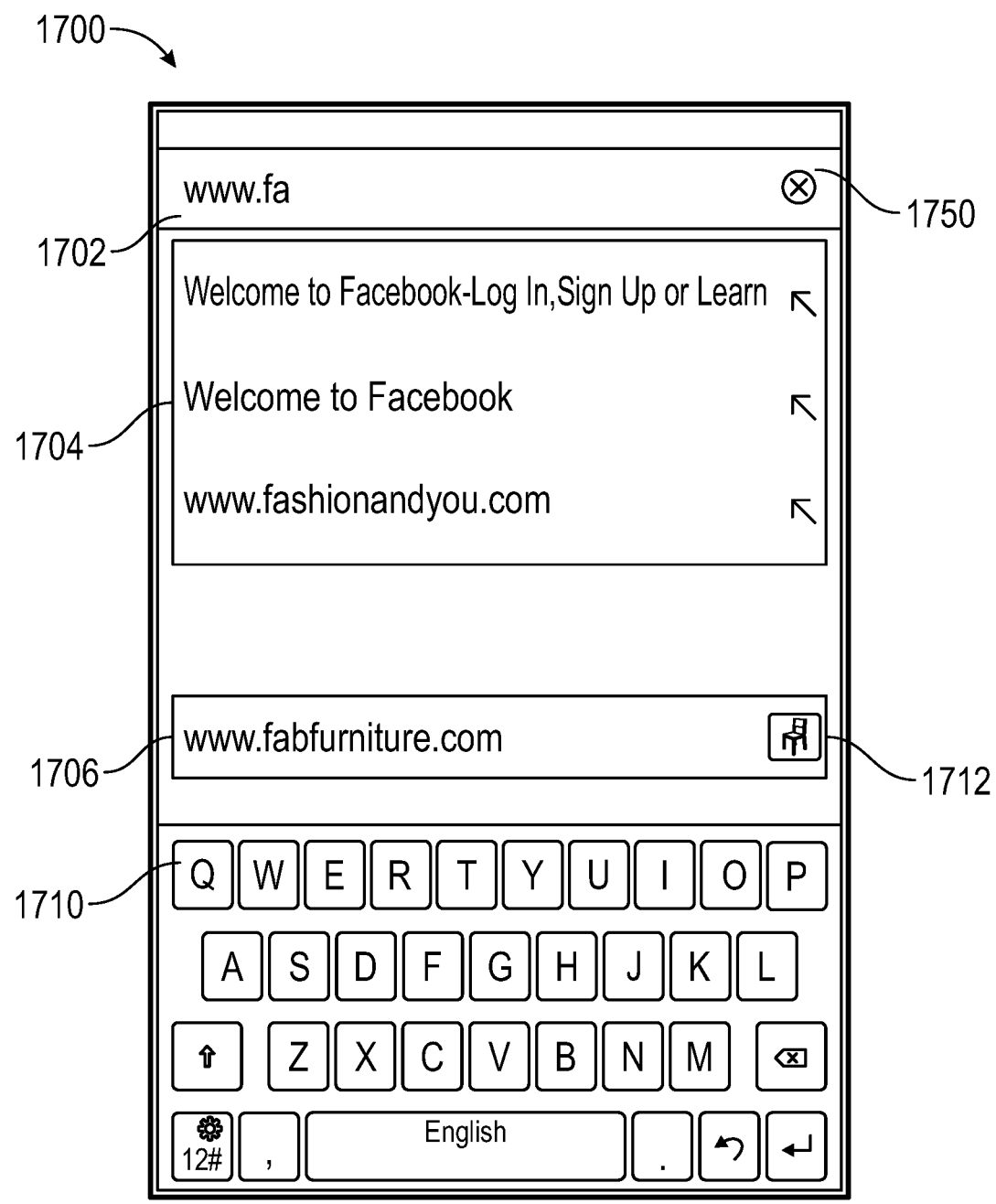

In a similar way, FIG. 17 illustrates a use case 1700, a user is entering text in a URL editor 1702 of a browser application/software on computing device 1750. The URL editor 1702 is the place where the user can enter a web address of interest, which further opens a webpage. In this scenario, when the user is entering a web address in the URL editor 1702, the recommendation engine of the present invention identifies the text entered so far by the user in the search editor and as discussed above, the process module along with the memory module associated with the user's computing device 1750 may identify relevant contextual data, as discussed above, associated with the user input text. In this case, user has entered "www.fa" and the prediction engine of the browser serves URL 1704, upon identification of relevant contextual data of the user recent input text and interaction with multiple applications/softwares across the computing device, the advertising server identifies and serves a URL which is registered by an advertiser and displays in the region 1706. In this scenario, when the user texted with another user, using a keyboard integrated with recommendation engine or the computing device is implemented with recommendation engine on purchasing furniture products or when the user posted on a social networking application regarding his intent to purchase furniture products and then user opened an e-commerce application on computing device and looked for a particular type of product by entering text in the search editor of the e-commerce application; the recommendation engine captures information on user's previous text input in messaging application or social networking application, user's interaction with applications, user's text input in search editor of an e-commerce application, user's input in the search editor of a browser application and intelligently predicts user's intent and serves a URL "www.fabfurniture.com." In the current case, the user's intent is identified as purchasing a product based on the text input while using messaging/social networking application. And, the type of intent, type of product which is furniture, is identified when user is entering text in a search editor of the e-commerce application. Also, identified the text input so far, "www.fa", by the user in the search editor of the browsing application. If there are multiple advertisers are registered for a search keyword or search contextual information, the URL is displayed on the display unit according to at device-server ranking system as discussed above.

Figure 18:
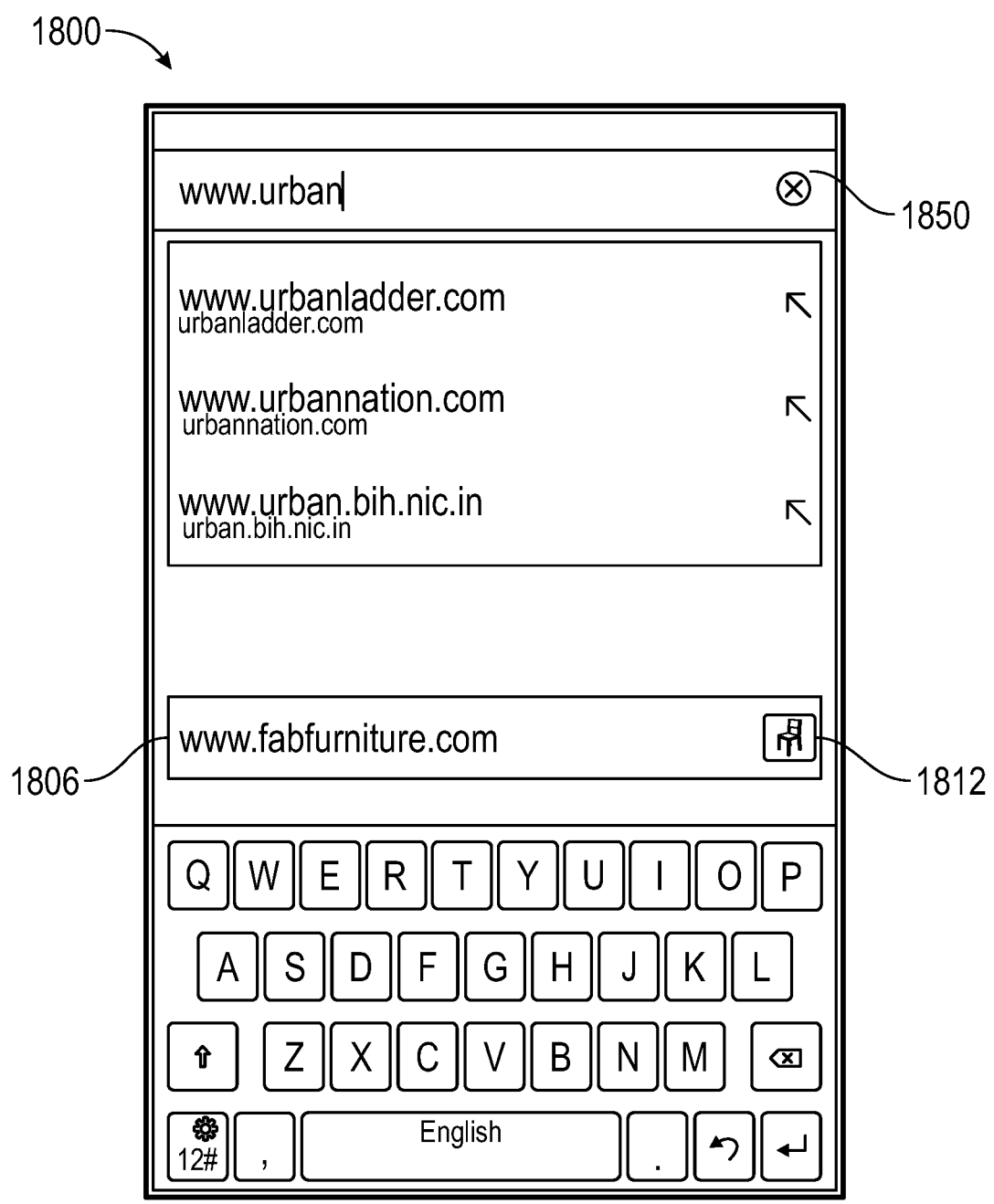

Also, it has to be noticed that the recommendation engine of the present invention can also predict user's intent and serve relevant URL type even when the user has entered a different text in the search editor of a browsing application unlike above example. FIG. 18 illustrates a view 1800 where the URL can be predicted not only based what user entered so far in the URL editor of a browser but also based on user's intent. In this case the sponsored URLs get prioritized based on user's intent and the URL with high score is served to user. In this scenario, the system of the present invention derives user's intent based on user's recent activity across multiple applications/softwares. For instance, user has recently texted with another user on purchasing sofa set to his new home, which is a furniture type. Based on the intent, the recommendation engine of the present invention serves URL of an advertiser who delivers or sells furniture in the display region 1806 of the advertiser 1812, as discussed in FIG. 17, on the user's computing device 11850. Also, it is not limited to serve the URL in the display region 1706 of FIG. 17.

Figure 19:
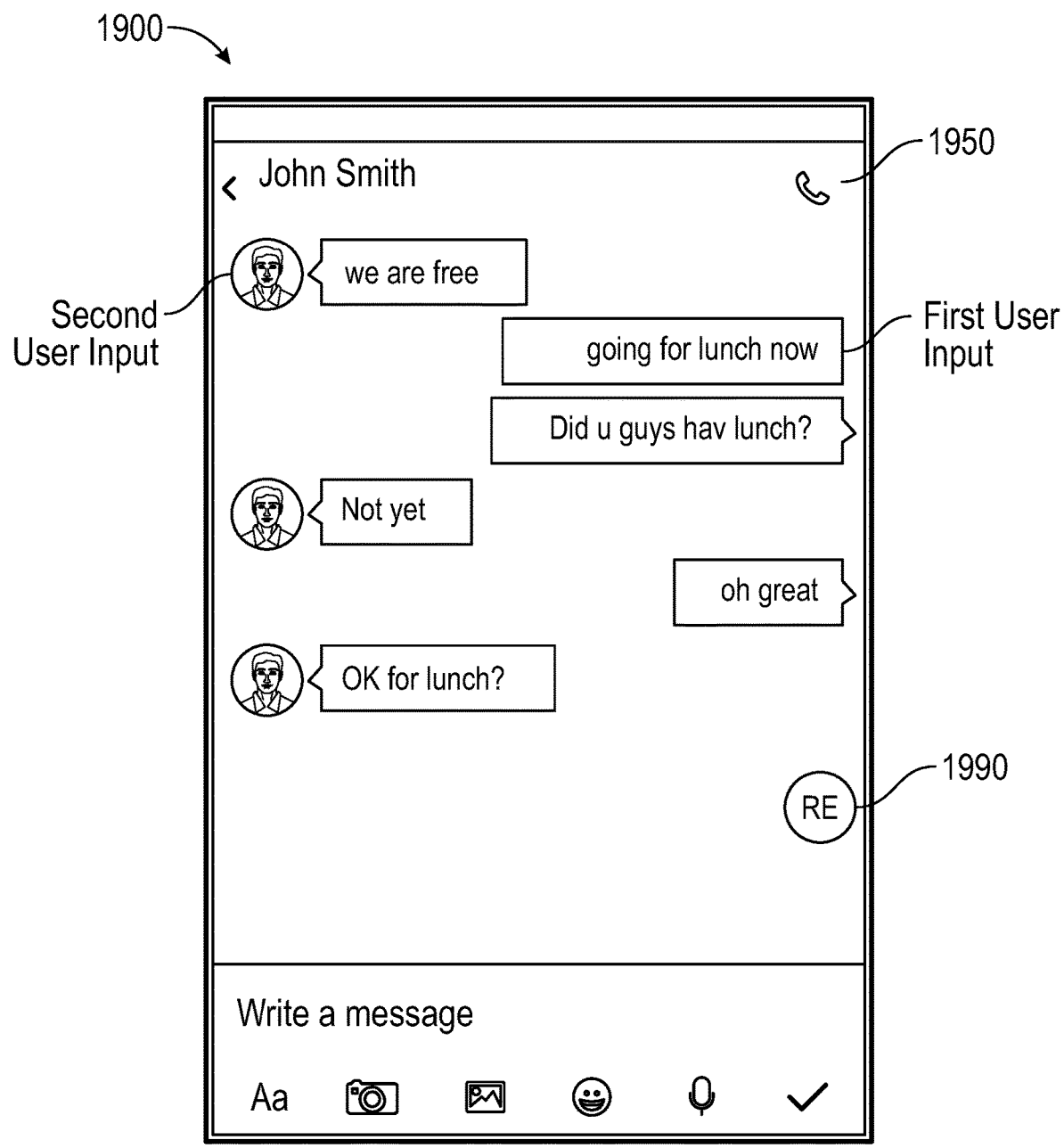
FIGS. 19 to 21 illustrates a screen shot of an exemplary contextual discovery application displaying exemplary graphical user interface involving a blob in accordance with still another embodiment.
Figure 20:
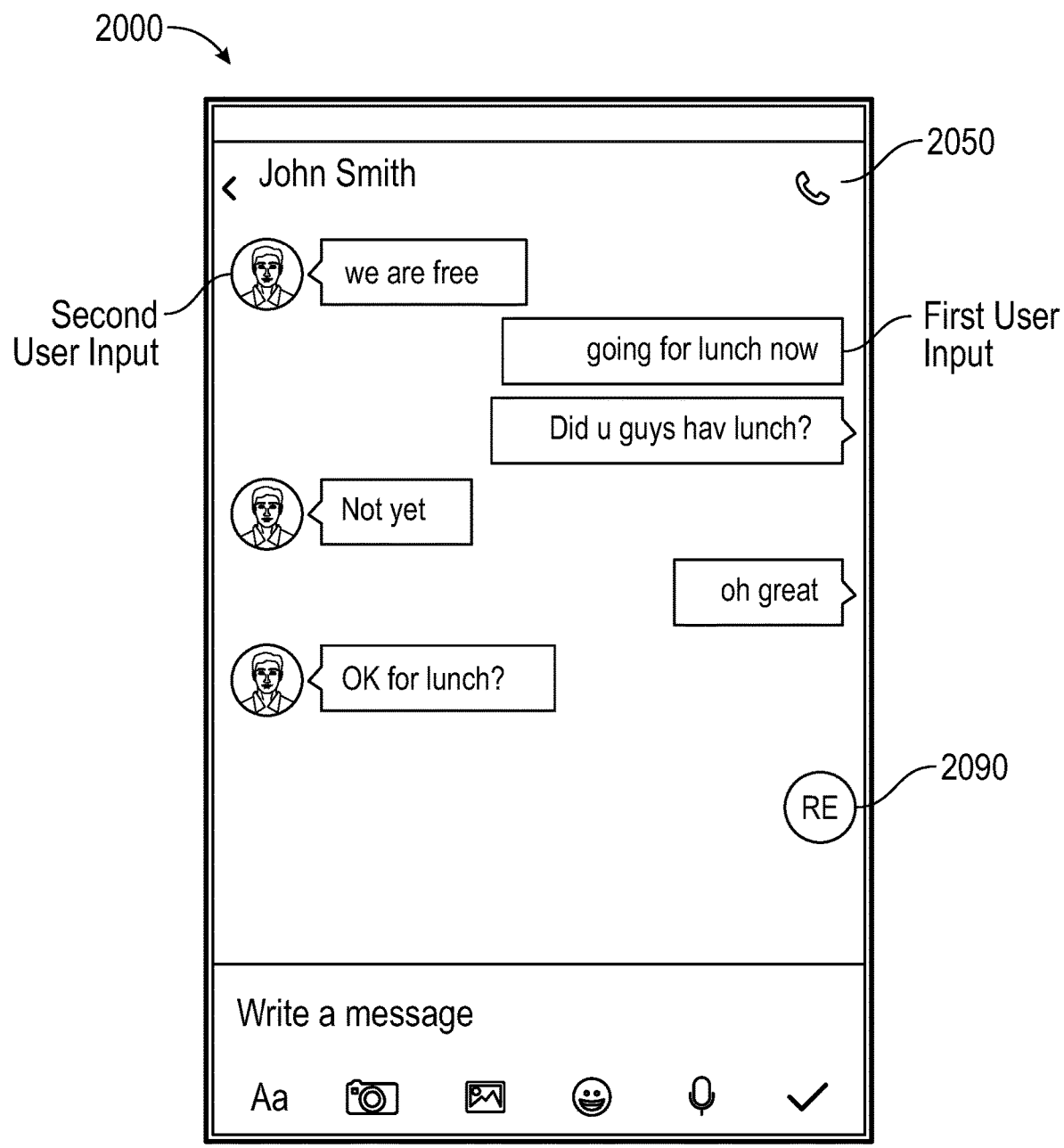

Now, the following illustrations show how the recommendation engine serves advertisements to user when a blob feature is integrated with the user's computing device. FIG. 19 illustrates a view 1900, when a first user is using a messenger application/software on computing device 1950, a social networking messenger for example, to chat with a second user. A recommendation engine blob feature 1990 is integrated on first user's computing device 1950 so that when the first user is having a conversation it initially in inactive mode. Once it identifies the received message and its content, hyper-context, user's intent and advertisements which are considered by user as favorites, the blob 1990 turns into active and notifies the user by a change in colour, as shown in FIG. 20. The blob 1990 of FIG. 19 can be freely moved on the computing device 1950 and it can be displayed on the messenger application/software at the texting or messaging and can be displayed anywhere on the screen even when user minimizes the recently used application/ software. The blob 1990 of FIG. 190 is shown as active mode 2090 in the FIG. 20. Upon accessing the active blob 2090 of FIG. 20 or 2190 of FIG. 21, at least one advertisement related to lunch with/without offers or deal is served to user, as shown in FIG. 22. The indication from the contextual key to the user is not limited to a colour change but can also be a vibration, a sound, an animation and the like.

Figure 21:
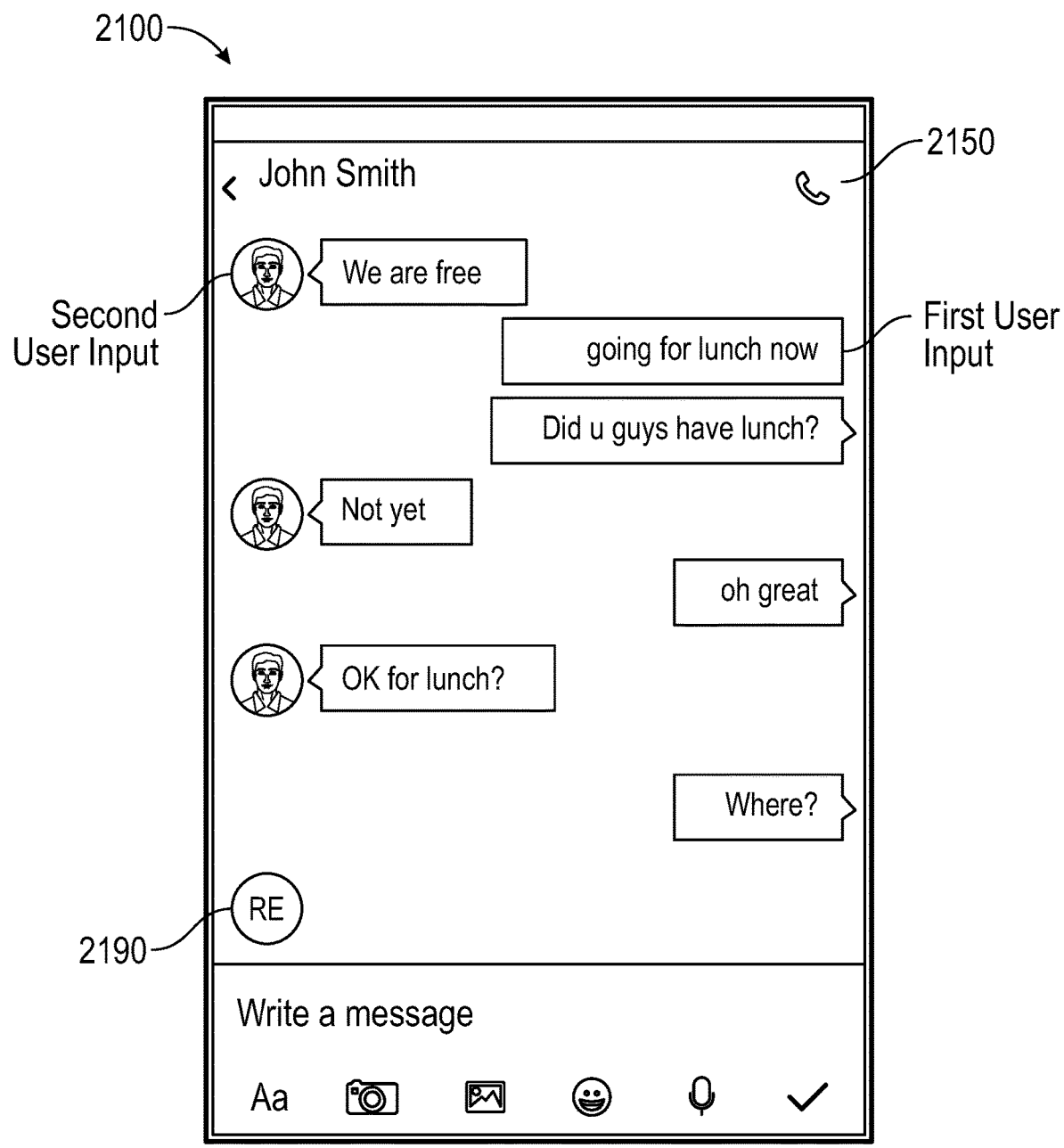
Figure 22:
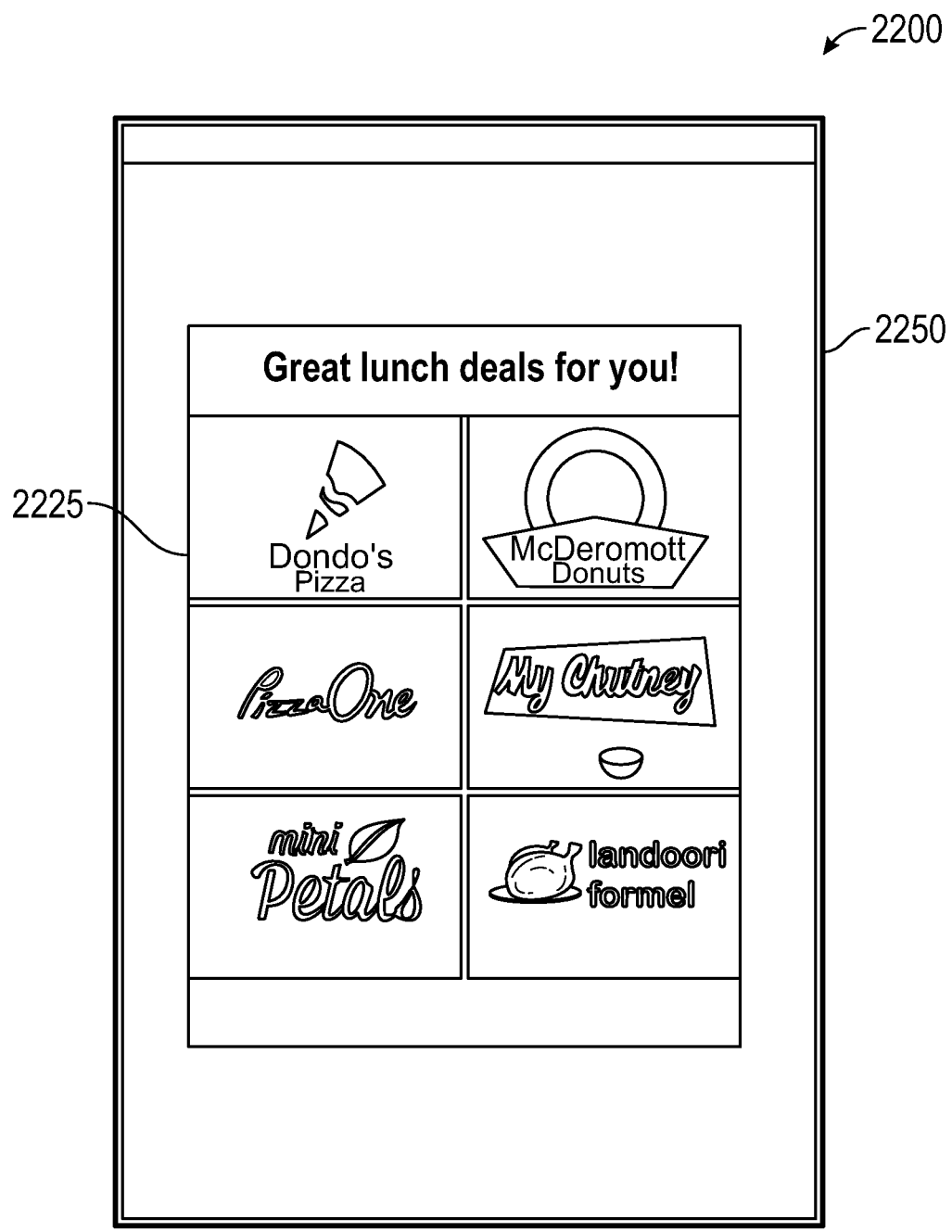
FIG. 22 illustrates a screen shot of an exemplary contextual discovery application displaying exemplary graphical user interface involving deals or search advertisements in accordance with still another embodiment.

FIG. 22 illustrates a view 2200, when the user has accessed the blob 2090 of FIG. 20 or 2190 of FIG. 21. The served advertisements or deals 2225 can be displayed on the computing device 2250 and can be sorted or prioritized based on device-server ranking system, user preferences and user favorites, as discussed above. The advertisements 2225 can be served from one or more deal aggregated advertisers, individual advertisers registered for a contextual information, individual advertisers registered for a keyword and the like.

The advertisements predicted based on received message and its content can be different from the advertisements predicted based on user's reply to the received message as these are changed dynamically based on user's intent and behaviour. The blob feature of the FIGS. 20 and 21 remains in active mode even after user minimizes the keyboard application/software or minimizes the messenger application/software and visits home screen. It is to be appreciated that home screen application/software can also be integrated with the recommendation of the present invention and in such cases user can directly see the advertisements on home screen.

It is noted that the UIs explained herein with reference to FIGS. 11 to 22 are for illustration purposes and that the computing device may be configured to provide contextually relevant advertisements/services based on the user input without limiting to the user input scenarios disclosed in FIGS. 11 to 22.

The above described various embodiments may be modified into many more alternative embodiments. It is to be noted that the systems and methods for serving search advertisements, as described in various embodiments, are not limited to the exemplary configuration as described with respect to FIGS. 2 to 22, but, these may be configured in a multitude of configurations. The systems can work as a background component (such as a plugin, etc.) for different applications, search engines, and the like. In various embodiments, these systems can be installed by the user or may be preloaded on a device from the OEM/Operator stable. Additionally, they can work with a keyboard to enable regular text prediction with context information and learning as the user is providing the user input (for example, by way of typing). In certain embodiments, said recommendation engine of the present invention may operate with a keyboard where no other component exists with it.

Users may utilize the contextual systems and methods for determining search advertisements and/or service relevant to the context of a user input in real-time. In various implementations, the contextual discovery systems and methods may enable the users to determine contextually relevant data/information quickly, directly and with one tap of a key. Upon selecting a service and/or advertisement can lead the user to more refined results displayed in a more application friendly way or directly take the user to a relevant or related Webpage.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

The invention claimed is:

1. A computing device in a client in a client-server environment, the computing device comprising:
   at least one memory device having instructions encoded thereon, the instructions representative of an intent discovery application; and
   a processing unit functionally coupled to the at least one memory and configured, by the instructions, to receive
   a set of information from a data acquisition operation on the computing device wherein the set of information comprises a plurality of contents from text of user inputs, a first content of the plurality of contents representative of at least one intent of a user of the computing device, the data acquisition operation stores in real time, on a storage unit associated with the processing unit, the set of information from the text of the user inputs received from one or more of at least one application executing on the computing device or at least one application previously executed on the computing device;
   to determine a relation between contents of the plurality of contents;
   to determine, at a first time, one or more intents of the user of the computing device based at least on the relation between the contents and the set of information;
   to prioritize the one or more intents based on the first time;
   to determine, from the set of information, a time of occurrence of an event;
   to cause a display device included in the computing device to present, as the user is entering input into a user interface associated with the computing device, intent related information that is based at least on the time of occurrence of the event and at least one intent of the one or more intents of the user of the computing device that was determined at, and prioritized based on, the first time, wherein the intent related information is further based on at least the set of information and a ranking based on at least one of a category advertisement type in relation to a particular intent and analytic information; and
   to prioritize, at a second time that is different from the first time, the one or more intents based at least on the time of occurrence of the event, wherein the one or more intents were previously determined at, and previously prioritized based on, the first time, wherein the second time is subsequent to the first time; and
   to serve for display at the display device, as the user is entering input into the user interface at the second time, intent related information associated with the one or more intents that is prioritized, at the second time, based at least on the time of occurrence of the event.

2. The computing device according to claim 1, wherein the processing unit is further configured to change the one or more intents dynamically based at least on the set of information, and wherein the processing unit is further configured to change the intent related information dynamically based on respective changes of the one or more intents.

3. The computing device according to claim 2, wherein the event is related to at least a temporal aspect, interactions with an application executing on the computing device, a text input, or a location.

4. The computing device according to claim 1, wherein the processing unit is further configured to process set of information using semantic analysis to identify words and phrases, and is further configured to process the words and phrases to identify contextual relations between at least the words to determine a likeliness of a word being grouped with other words of a phrase to determine a context of the phrase.

5. The computing device according to claim 1, wherein the processing unit is further configured to determine an intent of the user of the computing device using a portion of the set of information being acquired or a set of historical information originated across one or more computing device applications.

6. The computing device according to claim 1, wherein the intent related information comprises at least one of an advertisement, a search string, a text, a video, an audio segment, a service, a Uniform Resource Locator (URL), or a computing device application.

7. The computing device according to claim 1, wherein the one or more intents and the intent related information have at least one of a one-to-one relationship, a one-to-many relationship, or a many-to-one relationship.

8. The computing device according to claim 1, wherein the processing unit is further configured to at least map the set of information to a dictionary or map a one of a first word or a first phrase of a first dictionary onto one of a second word or a second phrase of a second dictionary, and wherein each of the first dictionary and the second dictionary is at least one of a language dictionary, a dictionary of search keywords, a dictionary of advertisements related words, a user-defined dictionary, or a intent mapping dictionary.

9. The computing device according to the claim 8, wherein the processing unit is further configured to map a first intent predicted at one instance with a second intent fed at another instance in a first intent mapping dictionary.

10. The computing device according to claim 8, wherein the set of information includes content in a first language and the intent related information is rendered in one of the first language or a second language.

11. The computing device according to claim 1, wherein the processing unit is further configured to generate a look-up chain of the intent related information, to determine proximity of the first intent to a second intent by traversing the look-up chain, and to cause the display device to present a second intent related information based at least on proximity of the first intent and the second intent.

12. The computing device according to the claim 11, wherein the processing unit is further configured to divide the set of information in multiple priority levels, and the intent related information generated based at least on a first priority level of the multiple priority levels corresponds to a similar first priority in the look-up chain.

13. The computing device according to claim 1, wherein the processing unit is further configured to store the one or more intents within a multi-dimensional vector associated with the user of the computing device, and further configured to generate each dimension of the multi-dimensional vector with a map between the one or more intents, the map associated with at least one attribute related to at least time, a set of related intents, a location, a date, text entered at the time that, language of the text entered at the time, or user preferences.

14. The computing device according to claim 13, wherein the processing unit is further configured to determine the intent related information by comparing the multi-dimensional vector associated with the user of the computing device with multi-dimensional vectors stored at a server.

15. The computing device according to claim 1, wherein the processing unit is further configured to generate a ranking of the intent related information based at least on a set of historical information originated across one or more computing device applications, and wherein the processing unit is further configured to cause the display device to present the intent related information based at least on the set of information and the ranking of the intent related information based at least on a set of historical information originated across one or more computing device applications.

16. The computing device according to claim 1, wherein the data acquisition acquires the set of information from at least one of a web application, a mobile application, or a desktop application,
    wherein the web application comprises a first email client, a chat client, a first web page, a widget application, a search engine, or a first applet, and
    wherein the mobile application comprises a home-screen application, a web browser, a second email client, a chat client, a second web page, or a second applet.

17. The computing device according to claim 1, wherein the instructions are configured to be integrated as a plug-in into at least one of the web application, the mobile application, the desktop application, the home-screen application, and the widget application.

18. The computing device according to claim 1, wherein the set of information comprises at least one of the contextual search information, contextual discovery information, contextual social information, contextual user preference context information, contextual user application interaction information.

19. The computing device according to claim 1, wherein the instructions are configured to be integrated into a keyboard application for enabling typing of the set of information, wherein the keyboard application is configured to cause the display device to present a suggestion bar for displaying the intent related information.

20. The computing device according to the claim 19, wherein the keyboard application is configured to display a selectable visual element indicative of a hyper-contextual discovery key indicative of presence of any intent related information while a text is being typed or recently typed using the keyboard application.

21. The computing device according to claim 1, wherein the processing unit is configured to process the set of information based at least on semantic analysis and sentiment analysis.

22. A computer-readable non-transitory storage medium having instructions encoded thereon that, in response to execution, cause a computing device to facilitate or perform operations comprising:
    receiving, a set of information from a data acquisition operation, wherein the set of information comprises a plurality of contents from text of user inputs, a first content of the plurality of contents being representative of at least one intent of a user of the computing device, the data acquisition operation stores in real time, on a storage unit associated with the processing unit, the set of information from the text of the user inputs received from one or more of at least one application executing on the computing device or at least one application previously executed on the computing device;

determining a relation or a map between contents of the set of information;

determining, at a first time, one or more intents of the user of the computing device based at least on the relation or map between the contents of the set of information;

prioritizing the one or more intents based on the first time;

determining, from the set of information, a time of occurrence of an event;

causing the display device to present, as the user is entering input into a user interface associated with the computing device, intent related information that is based at least on the time of occurrence of the event, and on the at least one intent of the one or more intents of the user of the computing device that was determined at, and prioritized based on, the first time, wherein the intent related information is further based on at least the set of information and a ranking based on at least one of a ranking based on at least one of a category advertisement type in relation to a particular intent and analytic information;

prioritizing, at a second time that is different from the first time, the one or more intents based at least on the time of occurrence of the event, wherein the one or more intents were previously determined at, and previously prioritized based on, the first time, wherein the second time is subsequent to the first time; and serving for display at the display device, as the user is entering input into the user interface at the second time, intent related information associated with the one or more intents that is prioritized, at the second time, based at least on the time of occurrence of the event.

23. The computer-readable non-transitory storage medium according to the claim 22, changing the one or more intents dynamically based at least on the set of information, and changing the intent related information dynamically based on change of intents.

24. The computer-readable non-transitory storage medium according to the claim 23, wherein the event is related to at least one of a temporal aspect, interactions with an application executing on the computing device, a text input or a location.

25. The computer-readable non-transitory storage medium according to claim 22, generating a ranking of the intent related information based at least on a set of historical information originated across one or more computing device applications, and causing a display device to present the intent related information based at least on the set of information and the ranking of the intent related information based at least on a set of historical information originated across one or more computing device applications.

26. A computer-readable non-transitory storage medium having instructions encoded thereon that, in response to execution, cause a computing device in a client-server environment to facilitate or perform operations comprising:

receiving a set of information from a data acquisition unit included in the computing device, wherein at least a part of the set of information is previously or currently being originated across two or more unrelated computing device applications using a keyboard application, and wherein the set of information comprises a plurality of contents, a first content of the plurality of contents being representative of at least one intent of a user of the computing device, the data acquisition unit store in real time, on a storage unit associated with the processing unit, the set of information from one or more of at least two applications currently executing on the computing device or at least two applications previously executed on the computing device;

determining, based at least on the set of processing information, a relation between contents of the set of information;

determining, at a first time, at least one intent of the user of the computing device based on the relation and the set of information;

determining, from the set of information, a time of occurrence of an event, wherein intent related information is configured to be presented, as the user is entering input, at the first time, into a user interface associated with the computing device, on a display device included in the computing device, wherein the intent related information is based at least on the time of occurrence of the event, and on at least one intent of the one or more intents of the user of the computing device that was prioritized based on the first time, wherein the intent related information is further based on at least the set of information and a ranking based on at least one of a ranking based on at least one of a category advertisement type in relation to a particular intent and analytic information; and prioritizing, at a second time that is subsequent to the first time, the at least one intent based at least on the time of occurrence of the event, wherein the at least one intent was previously determined at, and previously prioritized based on, the first time, wherein the intent related information associated with the at least one intent, that is prioritized at the second time and based at least on the time of the occurrence of the event, is configured to be presented, as the user is entering input, at the second time, into the user interface.

* * * * *